United States Patent
Buma

(10) Patent No.: US 9,446,652 B2
(45) Date of Patent: Sep. 20, 2016

(54) ROAD SURFACE STATE OBTAINING DEVICE AND SUSPENSION SYSTEM

(75) Inventor: Shuuichi Buma, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/417,058

(22) PCT Filed: Aug. 2, 2012

(86) PCT No.: PCT/JP2012/069720
§ 371 (c)(1),
(2), (4) Date: Jan. 23, 2015

(87) PCT Pub. No.: WO2014/020744
PCT Pub. Date: Feb. 6, 2014

(65) Prior Publication Data
US 2015/0174981 A1    Jun. 25, 2015

(51) Int. Cl.
*B60G 23/00* (2006.01)
*G08G 1/01* (2006.01)
(Continued)

(52) U.S. Cl.
CPC ......... *B60G 17/019* (2013.01); *B60G 17/0165* (2013.01); *B60G 17/0182* (2013.01);
(Continued)

(58) Field of Classification Search
CPC ............. H04N 7/181; B62J 2099/002; B62K 2204/00; B62K 2207/00; B62K 3/007; G06K 9/00805; G06K 9/46; G06K 9/4604
USPC ............ 701/37, 36, 38, 48, 28, 91; 180/362; 340/937
See application file for complete search history.

(56) References Cited

U.S. PATENT DOCUMENTS

2001/0019356 A1*  9/2001  Takeda et al. ......... H04N 7/181
                                                         348/119
2011/0098884 A1*  4/2011  Doi ........................ B62K 3/007
                                                          701/36

FOREIGN PATENT DOCUMENTS

JP          S59-91202 A        5/1984
JP          2006-303858    *  11/2006
(Continued)

OTHER PUBLICATIONS

Yoshioka et al, "Study of Preview Control for Electric Active Suspension," Translations of teh JSME(C), The Japan Society of Mechanical Engineers, vol. 76, No. 770, pp. 2372-2379, Oct. 2010.
(Continued)

*Primary Examiner* — Muhammad Shafi
(74) *Attorney, Agent, or Firm* — Oliff PLC

(57) ABSTRACT

An emitting device emits parallel light beams which impinge on a road surface, forming marks. An imaging device takes an image of an image pickup object containing the marks to obtain a picked-up image. A longitudinal distance between mark images respectively corresponding to the marks is detected. A larger gradient can be obtained in the case where the distance is long than in the case where the distance is short. While the gradient of the road surface is obtained based on the distance as described above, a relative positional relationship between the two mark images is not changed as long as the gradient of the road surface is the same even when the height position of an over-spring member provided with the emitting device and the imaging device is changed. Accordingly, the gradient of the road surface can be obtained without consideration of the displacement of the over-spring member.

14 Claims, 23 Drawing Sheets

(51) Int. Cl.
*B60G 17/019* (2006.01)
*B60G 17/0165* (2006.01)
*B60G 17/02* (2006.01)
*B60G 17/06* (2006.01)
*B60W 40/072* (2012.01)
*B60W 40/076* (2012.01)
*G06T 1/00* (2006.01)
*G06T 7/00* (2006.01)
*B60G 17/018* (2006.01)
*G06K 9/00* (2006.01)

(52) U.S. Cl.
CPC ............... *B60G17/02* (2013.01); *B60G 17/06* (2013.01); *B60W 40/072* (2013.01); *B60W 40/076* (2013.01); *G06K 9/00798* (2013.01); *G06T 1/00* (2013.01); *G06T 7/0057* (2013.01); *B60G 2401/14* (2013.01); *B60G 2500/10* (2013.01); *B60G 2500/20* (2013.01); *G06T 2207/30256* (2013.01)

(56) References Cited

FOREIGN PATENT DOCUMENTS

| | | |
|---|---|---|
| JP | 2006303858 A | 11/2006 |
| JP | 2007318460 A | 12/2007 |
| JP | 2008217267 A | 9/2008 |
| JP | 2009-276166 A | 11/2009 |
| JP | 2010-195323 * | 9/2010 |
| JP | 2010195323 A | 9/2010 |

OTHER PUBLICATIONS

Kanda et al, "Study of Ride Comfort Control Logic for Electric Active Stabilizer Suspension System," International Journal of Automotive Engineering, Society of Automotive Engineers of Japan, vol. 42, No. 2, pp. 323-328, Mar. 2011.

* cited by examiner $\theta c < \theta p$ (a)

DISTANCE e BETWEEN TWO POINTS

INCLINATION ANGLE $\gamma$ (b)

$\Delta e$ $\gamma < 0$ $\gamma > 0$ $\Delta \gamma$ $\theta p = 90°$ (a)

CASE WHERE $\theta c$ IS INCREASED (b)

$\theta c > \theta p$ (a)

(b)

$\theta p \geqq (90° - \gamma ap)$
APPROPRIATE CONDITION $\theta p > \theta c$ (a)

(b)

(c)

$\theta p \leq (90 - \gamma ap)$
APPROPRIATE CONDITION $\theta p < \theta c$ (a)

(b)

(c)

$\theta c - \delta pmax > \gamma ap$ (a)

(b)

(c)

(d)

(a)

FRONT SIDE OF VEHICLE BODY (b)

FRONT SIDE OF VEHICLE BODY (a)

(b)

(c)

(a)

(b)

(a)

(b)

(c)

(a)

(b)

(a)

(b) CASE OF REFERENCE ROAD SURFACE (c) CASE WHERE RIGHT SIDE IS HIGHER THAN LEFT SIDE bL1 < bR1

(d) CASE WHERE LEFT SIDE IS HIGHER THAN RIGHT SIDE bL2 > bR2

ROAD-SURFACE-GRADIENT OBTAINMENT

S61  OBTAINING bL, bR

S62  bL → αL
     bR → αR

S63  $(\alpha L + \alpha R)/2 \to \alpha f$

S64  OBTAINING xLR

RETURN

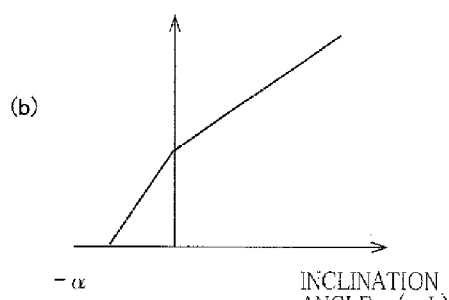

(b) LEFT-SIDE GRADIENT DETERMINATION TABLE
LATERAL DISTANCE bL vs INCLINATION ANGLE α (αL)
−α: RIGHT SIDE IS HIGHER THAN LEFT SIDE
+α: LEFT SIDE IS HIGHER THAN RIGHT SIDE

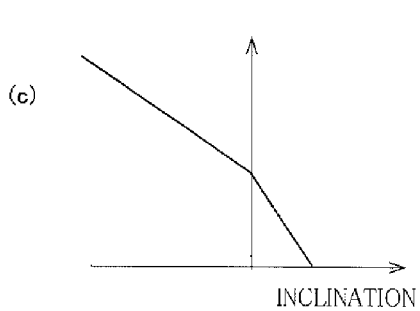

(c) RIGHT-SIDE GRADIENT DETERMINATION TABLE
LATERAL DISTANCE bR vs INCLINATION ANGLE α (αR)
−α: RIGHT SIDE IS HIGHER THAN LEFT SIDE
+α: LEFT SIDE IS HIGHER THAN RIGHT SIDE

ROAD SURFACE STATE OBTAINING DEVICE AND SUSPENSION SYSTEM

TECHNICAL FIELD

The present invention relates to a road surface state obtaining device configured to obtain a state of a road surface and a suspension system including the road surface state obtaining device.

BACKGROUND ART

A road surface state obtaining device disclosed in Patent Document 1 includes an emitting device and a camera. The emitting device emits laser light in a grid shape to a road surface, and the camera takes an image of the grid pattern to form an image. The road surface state obtaining device determines that the road surface is an ascending road surface in the case where a distance between two parallel horizontal lines in the grid pattern is narrower than that in the case where the road surface is flat or horizontal. On the other hand, the road surface state obtaining device determines that the road surface is a descending road surface in the case where the distance between the two parallel horizontal lines in the grid pattern is wider than that in the case where the road surface is flat. The paragraphs [0040] and [0056] have description that coordinates of each intersection of the grid are determined, and the determined coordinates are compared with coordinates in the case of the flat road to detect a three-dimensional shape of the road which includes the gradient of the road and the presence or absence of obstructions and unevenness of the road. Also, Claims 6 and 7 have description that the pattern is divided into a plurality of portions which are emitted one by one in order. This configuration can easily and accurately detect an intersection in the portion of the pattern.

Patent Document 2 discloses a road surface state obtaining device including a preview sensor configured to obtain unevenness of a portion of a road surface which is located in front of the vehicle. Examples of the preview sensor described in the paragraph [0010] include sensors using a laser, ultrasonic waves, or the like, and a sensor using a camera (for detecting unevenness of the road surface based on an image representative of the image-picked-up road surface. Also, Patent Document 2 discloses a system for controlling a suspension based on the unevenness state of the road surface which is obtained by the road surface state obtaining device. Specifically, a future movement of the vehicle is estimated based on the detected unevenness state of the road surface and a current movement of the vehicle such as over-spring vertical acceleration and an over-spring displacement, and control command values are output to the suspension when or before the vehicle passes through the road surface.

Non-Patent Documents 1, 2 disclose a road surface state obtaining device configured to obtain a state of a portion of a road surface which is located in front of a vehicle. This road surface state obtaining device uses a laser displacement sensor as a preview sensor to obtain a relative displacement between an over-spring member and the road surface. A road surface displacement is estimated based on the relative displacement measured by the preview sensor and a change in height position of the preview sensor (e.g., a height position of the over-spring member). The relative displacement measured by the preview sensor includes a displacement of the height position of the over-spring member. Accordingly, a displacement of an over-spring member is estimated, based on an identity observer, using longitudinal acceleration, lateral acceleration, over-spring vertical acceleration, a suspension stroke, an amount of rotation of a rotary actuator, and so on, and a displacement of the road surface is estimated based on the estimated displacement of the over-spring member and the relative displacement measured by the preview sensor.

Also, Non-Patent Documents 1, 2 have description that a suspension system executes FF skyhook control based on a road input and executes preview control in which control command values for an actuator are output a preview compensation time T, before passage of the vehicle through a portion of the road whose state is obtained by the road surface state obtaining device. This configuration can actuate the suspension in accordance with the passage of the vehicle through the road surface even if a delay in the actuator is large, which can satisfactorily suppress a vibration of the over-spring member, improving ride comfort.

PRIOR ART DOCUMENTS

Patent Documents

Patent Document 1: Japanese Patent Application Publication No. 2008-217267
Patent Document 2: Japanese Patent Application Publication No. 2010-195323
Non-Patent Document 1: Kenshiro Yosioka et al. "Development of Preview Control for Electric Active Suspension" Transactions of the JSME(C), The Japan Society of Mechanical Engineers, October 2010, Vol. 76, No. 770, pages 20-27
Non-Patent Document 2: Ryo Kanda et al. "Study of Ride Comfort Control Logic for Electric Active Stabilizer Suspension System, International Journal of Automotive Engineering, Society of Automotive Engineers of Japan, March 2011, Vol. 42, No. 2, pages 323-328

SUMMARY OF THE INVENTION

Problem to be Solved by the Invention

The object of the present invention is to improve a road surface state obtaining device and a suspension system including the road surface state obtaining device, for example, to allow obtainment of a magnitude of a gradient of a road surface as a road surface state and obtainment of the road surface state without consideration of, e.g., a displacement of an over-spring member.

Means for Solving Problem and Effects

A road surface state obtaining device according to the present invention emits light to a road surface to form a mark and then forms an image by taking an image of an image pickup object including the mark on a predetermined region. An inclination state of the road surface is obtained based on a mark image corresponding to a mark on the formed image.

For example, in the case where light is emitted in a state in which a plurality of parallel light beams impinge on the road surface to form a plurality of marks spaced apart from each other (or independent of each other) (hereinafter may be simply referred to as "the plurality of light beams parallel to each other are emitted"), an image of the image pickup object containing the plurality of marks formed on the road surface is taken to obtain a picked-up image. The inclination state of the road surface is obtained based on a relative positional relationship between the plurality of mark images on the picked-up image. Since a change in the inclination state of the road surface changes the relative positional relationship between the plurality of mark images, the inclination state of the road surface can be obtained based on the relative positional relationship between the plurality of mark images. The parallel light beams are emitted substantially at the same time, i.e., without a significant difference in time, and the plurality of marks are formed substantially at the same time.

The relative positional relationship between the plurality of mark images is determined by a relative positional relationship between each two of the plurality of mark images. For example, in the case where three mark images A, B, C are formed, a relative positional relationship between the three mark images A, B, C is represented by a relative positional relationship between the mark images A, B, a relative positional relationship between the mark images B, C, and a relative positional relationship between the mark images A, C. In the case where an inclination state in a front and rear direction is obtained based on the relative positional relationship between the mark images A, B, and an inclination state in a right and left direction is obtained based on the relative positional relationship between the mark images A, C, there is little need to consider the relative positional relationship between the mark images B, C. In the case where the inclination state in the front and rear direction is obtained, the relative positional relationship between the mark images A, B is enough to obtain the inclination state, and there is no need to consider the relative positional relationship between the mark images A, C and the relative positional relationship between the mark images B, C. As described above, in the case where three or more mark images are formed, relative positional relationships between two mark images for all combinations of the three or more mark images are not necessarily considered to obtain the inclination state of the road surface. In some case, an inclination state of the road surface in a desired direction may be obtained based on a relative positional relationship between desired two marks of the three or more mark images. In the case where two mark images are formed, the inclination state of the road surface is obtained based on a relative positional relationship between the two mark images. In the present specification, these cases will be hereinafter collectively referred to as "the inclination state of the road surface is obtained based on the relative positional relationship between the at least two of the plurality of mark images". As will be described below, this applies to the case where the inclination state of the road surface is obtained based on a relative positional relationship between a plurality of points on the one mark image.

Examples of the relative positional relationship include a distance (length) between the two mark images, a distance between the two mark images in a predetermined direction, and a relationship between positions of the respective two mark images (which positions can be each represented by coordinates on the picked-up image). Examples of the inclination state include a magnitude of the gradient, a direction of the gradient, and a state of change in the gradient. The magnitude of the gradient may be represented as a magnitude of the inclination angle and may be represented as a value of tangent of the inclination angle. As described above, the present road surface state obtaining device differs from the road surface state obtaining device disclosed in Patent Document 1 in that, for example, the plurality of mark images are formed spaced apart from each other independently of each other, and the inclination state is obtained based on the relative positional relationship between the at least two of the plurality of mark images.

In the case where light is emitted in the state in which a mark is formed on the road surface by one light beam having impinged thereon, the magnitude of the gradient of the road surface is obtained based on a relative positional relationship between at least two of a plurality of point images on a mark image corresponding to the one mark formed on the road surface, and the plurality of point images correspond respectively to a plurality of predetermined points on the one mark. A predetermined relationship is established between the magnitude of the gradient of the road surface and the relative positional relationship between the at least two of the plurality of point images. Accordingly, the magnitude of the gradient of the road surface can be obtained based on the obtained relative positional relationship and the predetermined relationship. Patent Document 1 has no description about the obtainment of the magnitude of the gradient of the road surface.

Since the emitting device and the imaging device are mounted on the vehicle body, respective height positions of the emitting device and the imaging device from the road surface change due to change in the vehicle height. Thus, in the case where, as described in Patent Document 2 and Non-Patent Documents 1, 2, the road surface state obtaining device measures a relative distance between the vehicle body and the road surface and obtains the height position and so on based on the measured relative distance, a change in height position of the vehicle body (i.e., the over-spring displacement) needs to be considered when obtaining the state of the road surface. The over-spring displacement is obtained based on, e.g., values detected by an over-spring vertical acceleration sensor and a vehicle height sensor.

On the other hand, the road surface state obtaining device according to the present invention, there is only a little need to consider the over-spring displacement because the inclination state of the road surface is obtained based on the relative positional relationship between the plurality of mark images and the relative positional relationship between the plurality of point images on the one mark image, for example. This is because even when the height position of the over-spring member changes, the relative positional relationship between the plurality of mark images and the relative positional relationship between the plurality of point images on the mark image do not change as long as the inclination state of the road surface is not changed. Accordingly, the road surface state obtaining device according to the present invention can obtain the inclination state of the road surface without consideration of the over-spring displacement. Also, in the case where the inclination state of the road surface is obtained, the sensors such as the over-spring vertical acceleration sensor and the vehicle height sensor are not necessary, making it possible to suppress increase in cost by eliminating the over-spring vertical acceleration sensor and the vehicle height sensor.

An angle of pitch of the vehicle body during running of the vehicle is small with respect to the inclination state of the road surface (e.g., the magnitude of the gradient). Also, the pitch angle is small with respect to a followability of the actuator with respect to the road surface. Accordingly, the inclination state of the road surface can also be obtained without consideration of the pitch of the vehicle body, and in this case the inclination state can be obtained more easily.

Claimable Invention

There will be described inventions recognized to be claimable in the present invention.

(1) A road surface state obtaining device, comprising:

an emitting device mounted on a vehicle body of a vehicle and configured to emit light such that a plurality of parallel light beams emitted from the emitting device impinge on a road surface to form a plurality of marks spaced apart from each other;

an imaging device mounted on the vehicle body and configured to form an image by taking an image of an image pickup object on a predetermined region containing the plurality of marks formed on the road surface; and an inclination state obtainer configured to obtain an inclination state of the road surface based on a relative positional relationship between at least two mark images of a plurality of mark images on the image formed by the imaging device, the plurality of mark images respectively corresponding to the plurality of marks.

The emitting device emits a plurality of light beams parallel to each other, but the light beams emitted from the emitting device may or may not be parallel with each other. The plurality of light beams parallel to each other mean that the light beams are parallel with each other within an area in which the light beams can be considered to be parallel with each other near the road surface, and the emitted light beams may not be parallel with each other. The emitting device may include one light source for emitting light so as to form a plurality of light beams parallel to each other and may include a plurality of light sources for emitting light so as to form one light beam.

Laser light can be used as the light emitted from the emitting device, for example. The light emitted from the emitting device is not limited to visible light and may be infrared light and ultraviolet light. While the plurality of marks are formed spaced apart from each other independently of each other, each of the plurality of marks preferably has a spot shape. However, the shape of the mark is not limited to the spot shape and may be a line shape, a polygonal shape, or the like.

The imaging device may be configured to include an imaging element such as a CCD camera.

(2) The road surface state obtaining device according to the above form (1), wherein the inclination state obtainer comprises (a) a longitudinal distance obtainer configured to obtain a distance in the longitudinal direction between the at least two mark images of the plurality of mark images contained in the image obtained by the imaging device, as the relative positional relationship and (b) a gradient obtainer configured to obtain a gradient as the inclination state of the road surface based on the distance between the at least two mark images in the longitudinal direction which distance is obtained by the longitudinal distance obtainer.

(3) The road surface state obtaining device according to the above form (2), wherein the gradient obtainer comprises a gradient-determination-table storage device configured to store a relationship between the gradient of the road surface and the distance between the at least two mark images in the longitudinal direction which distance is obtained by the longitudinal distance obtainer.

The longitudinal direction is the x direction in FIGS. 1 and 5 and corresponds to a longitudinal direction, i.e., a front and rear direction of the vehicle (or an up and down direction) when viewed from the imaging device. It is noted that the y direction in FIGS. 1 and 5 corresponds to a widthwise direction of the vehicle (i.e., a right and left direction) when viewed from the imaging device and may be referred to as "lateral (horizontal) direction" on the picked-up image.

In the case where the light beam is emitted generally in the front and rear direction of the vehicle, and an axis of the imaging device (e.g., a line perpendicular to a lens of the camera) extends generally in the front and rear direction of the vehicle and in the case where the parallel light beams impinge on the road surface so as to be spaced apart from each other in the front and rear direction of the vehicle (that is, the marks are formed on the road surface so as to be spaced apart from each other in the front and rear direction), the gradient of the road surface in the front and rear direction is obtained based on the distance between the two mark images in the longitudinal direction.

For example, in the case where an inclination angle of an ascending inclined surface as the magnitude of the gradient of the road surface is represented as a positive value, and an inclination angle of a descending inclined surface as the magnitude of the gradient of the road surface is represented as a negative value, the distance between the two mark images in the longitudinal direction and the magnitude of the gradient are in one-to-one correspondence relationship, and a predetermined relationship is established between the distance and the magnitude of the gradient. Accordingly, by obtaining and storing the relationship in advance, the magnitude of the gradient, i.e., the magnitude of the inclination angle and the direction of the inclination can be obtained based on the relationship and the distance between the two mark images in the longitudinal direction. Also, opposite directions of the inclination of the road surface in the front and rear direction can be obtained between the case where the distance between the two mark images in the longitudinal direction is longer than a set value and the case where the distance between the two mark images in the longitudinal direction is smaller than the set value. The set value corresponds to a distance between two marks formed on a road surface in the case where light is emitted to a reference road surface, and the distance between these two marks is determined, based on, e.g., a cycle by which the inclination state of the road surface is obtained and a running speed of the vehicle, to such a value that inclination-state obtainment objects do not overlap each other even if the vehicle is running at a low speed. The set value is preferably obtained and stored in advance because the set value is determined according to the specifications of the emitting device (e.g., a distance between the plurality of parallel light beams and an angle of the emitted parallel light beams with respect to the reference road surface), the specifications of the imaging device (e.g., an inclination angle of the axis with respect to the reference road surface), and the relative positional relationship between the emitting device and the imaging device.

In the case where the light beam is emitted generally in the front and rear direction of the vehicle, and the axis of the imaging device extends generally in the front and rear direction of the vehicle and in the case where the parallel light beams impinge on the road surface so as to be spaced apart from each other in the widthwise direction of the vehicle (that is, the marks are formed on the road surface so as to be spaced apart from each other in the right and left direction), the gradient of the road surface in the widthwise direction (i.e., the right and left direction) is obtained based on the distance between the two mark images in the longitudinal direction (i.e., a displacement in the front and rear direction).

(4) The road surface state obtaining device according to the above form (2) or (3), wherein the emitting device and the imaging device are mounted on the vehicle body in a relative positional relationship in which an emission angle of the light emitted from the emitting device with respect to a reference road surface of which normal line is a line extending in an up and down direction of the vehicle is greater than an inclination angle of an axis of the imaging device with respect to the reference road surface, and wherein the gradient obtainer comprises a first gradient obtainer configured to obtain a greater gradient of the road surface when the distance between the at least two mark images in the longitudinal direction which distance is obtained by the longitudinal distance obtainer is long than when the distance between the at least two mark images in the longitudinal direction which distance is obtained by the longitudinal distance obtainer is short.

In the case where the gradient of the road surface in the front and rear direction of the vehicle is represented using positive and negative signs, the larger gradient is obtained (that is, the inclination angle of the ascending inclined surface is large, and an absolute value of the inclination angle of the descending inclined surface is small) in the case where the distance in the longitudinal direction is long than in the case where the distance in the longitudinal direction is short.

This applies to the gradient of the road surface in the right and left direction. In the case where the distance between the two mark images in the longitudinal direction is represented as a positive value when the right mark image is located on an x+ side of the left mark image, and the distance between the two mark images in the longitudinal direction is represented as a negative value when the right mark image is located on an x− side of the left mark image, and in the case where the inclination angle of the road surface in the right and left direction is represented as a positive value when a left portion of the road surface is higher than its right portion, and the inclination angle of the road surface in the right and left direction is represented as a negative value when the right portion of the road surface is higher than its left portion, the larger inclination angle is obtained in the case where the distance is long than in the case where the distance is short.

It is noted that the reference road surface is such a road surface that a line extending in the up and down direction of the vehicle coincides with a road surface normal line of the road surface. That is, the reference road surface is a road surface contacted by the front wheels and the rear wheels of the vehicle.

(5) The road surface state obtaining device according to the above form (4), wherein the inclination state obtainer comprises a first inclination obtainer configured to obtain a positive value as an inclination angle of the road surface when the distance between the at least two mark images in the longitudinal direction which distance is obtained by the longitudinal distance obtainer is greater than a set value and configured to obtain a negative value as the inclination angle of the road surface when the distance between the at least two mark images in the longitudinal direction is less than the set value.

(6) The road surface state obtaining device according to the above form (4) or (5), wherein the gradient obtainer comprises a first gradient-determination-table storage device configured to store a relationship between the gradient of the road surface and the distance obtained by the longitudinal distance obtainer, the relationship being a relationship in which an inclination angle of the road surface in a front and rear direction is greater when the distance in the longitudinal direction is long than when the distance in the longitudinal direction is short, and a distance change ratio which is an amount of change in the distance in the longitudinal direction with respect to an amount of change in the inclination angle of the road surface in the front and rear direction is less when the distance in the longitudinal direction is greater than the set value than when the distance in the longitudinal direction is less than the set value.

(7) The road surface state obtaining device according to the above form (2) or (3), wherein the emitting device and the imaging device are mounted on the vehicle body in a relative positional relationship in which an emission angle of the light emitted from the emitting device with respect to a reference road surface of which normal line is a line extending in an up and down direction of the vehicle is less than an inclination angle of an axis of the imaging device with respect to the reference road surface, and wherein the gradient obtainer comprises a second gradient obtainer configured to obtain a less gradient of the road surface when the distance between the plurality of mark images in the longitudinal direction which distance is obtained by the longitudinal distance obtainer is long than when the distance between the at least two mark images in the longitudinal direction is short.

The inclination angle of the road surface in the front and rear direction is smaller (the absolute value of the inclination angle of the ascending inclined surface is smaller, and the absolute value of the inclination angle of the descending inclined surface is larger) in the case where the distance in the longitudinal direction is long than in the case where the distance in the longitudinal direction is short. This applies to the inclination angle in the right and left direction.

(8) The road surface state obtaining device according to the above form (7), wherein the inclination state obtainer comprises a second inclination obtainer configured to obtain a negative value as the inclination angle of the road surface when the distance between the plurality of mark images in the longitudinal direction which distance is obtained by the longitudinal distance obtainer is greater than a set value and configured to obtain a positive value as the inclination angle of the road surface when the distance between the plurality of mark images in the longitudinal direction is less than the set value.

(9) The road surface state obtaining device according to the above form (7) or (8), wherein the gradient obtainer comprises a second gradient-determination-table storage device configured to store a relationship between the gradient of the road surface and the distance between the at least two mark images in the longitudinal direction which distance is obtained by the longitudinal distance obtainer, the relationship being a relationship in which an inclination angle of the road surface in a front and rear direction is less when the distance in the longitudinal direction is long than when the distance in the longitudinal direction is short, and a distance change ratio which is an amount of change in the distance in the longitudinal direction with respect to an amount of change in the inclination angle of the road surface in the front and rear direction is greater when the distance in the longitudinal direction is greater than the set value than when the distance in the longitudinal direction is less than the set value.

(10) The road surface state obtaining device according to any one of the above forms (1) through (9), wherein the emitting device and the imaging device are mounted on the vehicle body in a state in which each of an emission angle of the light emitted from the emitting device with respect to a reference road surface of which normal line is a line extending in an up and down direction of the vehicle and an inclination angle of an axis of the imaging device with respect to the reference road surface is greater than a first set angle.

One example of the first set angle is the sum (γap+δpmax) of a maximum value γap of a normal inclination angle of the road surface and a maximum value of an inclination angle (i.e., a pitch angle) of the vehicle body during running of the vehicle or a maximum value δpmax of an inclination angle of the vehicle body which is determined by a structure of the vehicle.

In the case where the emitting device and the imaging device are mounted in a state satisfying the above-described condition, light can impinge on the road surface, and an image of the marks formed on the road surface can be taken even in the case where the road surface is a descending inclined surface. One example of the first set angle ranges generally between 20° and 25°.

Another example of the first set angle is the sum (βact+δpmax) of an angle βact controllable per unit time which is determined by an ability of the actuator and a maximum value δpmax of the pitch angle.

An amount of displacement of the under-spring member in the up and down direction which is controllable per unit time by the actuator is well known. By dividing the amount of displacement in the up and down direction by a distance of travel of the vehicle per unit time, a value of tangent of the inclination angle of the road surface which is controllable by the actuator can be obtained, and the angle βact controllable by the actuator can be obtained. The first set angle in this case ranges generally between 7° and 15°. As described above, the inclination state of the road surface in front of the vehicle (specifically, in front of the vehicle by greater than or equal to a predetermined distance) can be obtained by reducing the emission angle of the light beam emitted from the emitting device and the inclination angle of the axis of the imaging device with respect to the reference road surface.

(11) The road surface state obtaining device according to any one of the above forms (1) through (10), wherein the emitting device and the imaging device are mounted on the vehicle body in a relative positional relationship in which an emission angle of the light emitted from the emitting device with respect to a reference road surface of which normal line is a line extending in an up and down direction of the vehicle is greater than an inclination angle of an axis of the imaging device with respect to the reference road surface.

In the case where the inclination angle of the axis of the imaging device is larger than the emission angle, the mark image on the picked-up image is far from the reference position on the substantially flat road surface, which requires a processing area to be made larger in the case where an image is obtained. In contrast, in the case where the inclination angle of the axis of the imaging device is less than the emission angle, the mark image on the picked-up image is located near the reference position on the substantially flat road surface, making it possible to make the processing area smaller. As a result, a time required for processing can be reduced in the case where the vehicle runs on the substantially flat road surface. Also, the mark image is located near the reference position, making it possible to accurately detect the relative positional relationship between the two mark images. It is noted that the reference position is a position on the picked-up image which corresponds to a position through which the axis of the imaging device passes on the road surface.

In the case where the inclination angle of the axis of the imaging device is greater than the emission angle, the mark image is located nearer to the reference position on the picked-up image in the case where the gradient is large than in the case where the gradient is small. Thus, the processing area decreases with increase in the gradient, and in this case the direction of increase in the gradient and the direction of increase in the processing area are reverse to each other. In contrast, in the case where the inclination angle of the axis of the imaging device is less than the emission angle, the mark image is farther from the reference position in the case where the gradient is large than in the case where the gradient is small. Accordingly, the processing area is larger in the case where the gradient of the road surface is large than in the case where the gradient of the road surface is small, so that the direction of increase in the gradient and the direction of increase in the processing area advantageously coincide with each other.

(12) The road surface state obtaining device according to any one of the above forms (1) through (11), wherein the emitting device and the imaging device are mounted on the vehicle body in a relative positional relationship in which an emission angle of the light emitted from the emitting device with respect to a reference road surface of which normal line is a line extending in an up and down direction of the vehicle is greater than a second set angle, and an inclination angle of an axis of the imaging device with respect to the reference road surface is less than the emission angle.

One example of the second set angle is a value (90°−γ) obtained by subtracting the inclination angle γ of the road surface from 90°, i.e., an angle between the reference road surface and the normal line of an estimated road surface (i.e., a road surface with the inclination angle γ). In the case where the emission angle of light with respect to the road surface is made larger than the road surface normal line, and the inclination angle of the axis of the imaging device with respect to the road surface is made less than the emission angle, the emitted light is reflected from the road surface, and the reflected light can be received satisfactorily.

In the case where a suspension control is executed for suppressing a transmission of an under-spring force due to the road surface displacement to the over-spring member, when the case where the vehicle passes through an ascending and descending road surface and the case where the vehicle passes through a descending and ascending road surface are compared with each other, the suspension control is more necessary in the case where the vehicle passes through the ascending and descending road surface than in the case where the vehicle passes through the descending and ascending road surface. Thus, the emitting device and the imaging device are preferably mounted in a state in which a state of the ascending and descending road surface (e.g., the magnitude of an approach angle) can be obtained satisfactorily.

For example, the estimated road surface may be set at a road surface with an inclination angle (a maximum inclination angle) γap. Also, a minimum value of the axis of the imaging device is determined by a relative positional relationship between the emitting device and the processing area of the imaging device.

(13) The road surface state obtaining device according to any one of the above forms (1) through (10), wherein the emitting device and the imaging device are mounted on the vehicle body in a relative positional relationship in which an emission angle of the light emitted from the emitting device with respect to a reference road surface of which normal line is a line extending in an up and down direction of the vehicle is less than a second set angle, and an inclination angle of an axis of the imaging device with respect to the reference road surface is greater than the emission angle.

(14) The road surface state obtaining device according to any one of the above forms (1) through (13), wherein the emitting device is mounted on the vehicle body in a state in which a distance between two marks arranged in a front and rear direction among a plurality of marks formed by a plurality of light beams parallel to each other which have impinged on a reference road surface of which normal line is a line extending in an up and down direction of the vehicle is less than a reference value determined based on a running speed of the vehicle and a cycle by which the inclination state is obtained by the inclination state obtainer.

An area containing the two marks arranged in the front and rear direction among the plurality of marks formed on the road surface is an inclination-state obtainment object. A gradient of the inclination-state obtainment object is obtained once every set time period (i.e., an obtaining cycle), but this inclination-state obtainment object moves with movement of the vehicle. Thus, even in the case where the running speed of the vehicle is a set speed (e.g., about 20 km/h), the distance of the two marks is preferably made shorter than the reference value such that the inclination-state obtainment objects do not overlap each other.

(15) The road surface state obtaining device according to any one of the above forms (1) through (14), wherein the inclination state obtainer comprises an imaging-error-case inclination state obtainer configured to determine that the inclination state of the road surface is identical to an inclination state of the road surface which is obtained previously, when one or less mark image is contained in the picked-up image.

(16) The road surface state obtaining device according to any one of the above forms (1) through (15), wherein the emitting device is mounted on the vehicle body in an attitude in which the light is emitted toward the road surface in a front and rear direction of the vehicle, wherein the imaging device is mounted on the vehicle body in an attitude in which an axis of the imaging device extends in the front and rear direction of the vehicle, and wherein the inclination state obtainer is configured to obtain an inclination state of the road surface in at least one of the front and rear direction and a right and left direction of the vehicle based on the distance between the at least two mark images in the longitudinal direction.

In the case where two of the plurality of parallel light beams are emitted so as to be spaced apart from each other in the front and rear direction, the inclination state of the road surface in the front and rear direction of the vehicle is obtained, and in the case where the parallel two light beams are emitted so as to be spaced apart from each other in the right and left direction, the inclination state of the road surface in the right and left direction of the vehicle is obtained.

(17) The road surface state obtaining device according to the above form (1), wherein the emitting device is mounted on the vehicle body in an attitude in which the light is emitted toward the road surface in a right and left direction of the vehicle in a state in which at least two of the plurality of marks are arranged in the right and left direction, wherein the imaging device is mounted on the vehicle body in an attitude in which an axis of the imaging device extends in a right and left direction of the vehicle, and wherein the inclination state obtainer comprises (a) a lateral distance obtainer configured to obtain, as the relative positional relationship, a distance in a lateral direction between at least two mark images of a plurality of mark images contained in the image obtained by the imaging device, and (b) a right-and-left-direction gradient obtainer configured to obtain a gradient of the road surface in the right and left direction based on the distance in the lateral direction between the at least two mark images which distance is obtained by the lateral distance obtainer.

In the case where, as illustrated in FIG. 22(a), the emitting device is mounted in an attitude in which the emitting device emits a plurality of parallel light beams generally in the right and left direction of the vehicle, and the imaging device is mounted in an attitude in which its axis extends in the right and left direction, a distance between two mark images in the lateral direction changes based on an inclination angle and a direction of the inclination in the right and left direction. Accordingly, the inclination state of the road surface in the right and left direction can be obtained based on the distance between the two mark images in the lateral direction.

The road surface state obtaining device according to this form may employ the technical features described in the above forms (2) through (15) as needed.

(18) A road surface state obtaining device, comprising:

an emitting device mounted on a vehicle body of a vehicle and configured to emit light such that the light impinges on a road surface to form at least one mark;

an imaging device mounted on the vehicle body and configured to form an image by taking an image of an image pickup object on a predetermined region containing the at least one mark formed on the road surface; and an inclination state obtainer configured to obtain a magnitude of a gradient of the road surface as an inclination state of the road surface, based on a relative positional relationship between at least two of a plurality of point images on a mark image corresponding to one mark of the at least one mark on the image formed by the imaging device, the plurality of point images respectively corresponding to a plurality of points respectively provided on set positions on the one mark.

In the road surface state obtaining device according to this form, the magnitude of the gradient of the road surface is obtained based on the relative positional relationship between the at least two of the plurality of point images.

The road surface state obtaining device according to this form may employ the technical features described in any one of the above-described forms (1) through (17). For example, the inclination state of the road surface can be obtained by combination of the technical features described in the above-described form (1). For example, the road surface state can be obtained by combination of a relative positional relationship between the plurality of marks and a relative positional relationship between the plurality of points on the one mark, and the road surface state can be obtained based on a relative positional relationship between a plurality of points on each of the plurality of marks and the relative positional relationship between the plurality of marks.

(19) A road surface state obtaining device comprising:

an emitting device mounted on a vehicle body of a vehicle and configured to emit light such that the light impinges on a road surface to form at least one mark;

an imaging device mounted on the vehicle body and configured to form an image by taking an image of an image pickup object on a predetermined region containing the at least one mark formed on the road surface; and an inclination state obtainer configured to obtain an inclination state of the road surface based on a relative positional relationship between a plurality of point images on a mark image corresponding to one mark of the at least one mark on the image formed by the imaging device, the plurality of point images respectively corresponding to a plurality of predetermined points provided on a line defining an outer shape of the one mark.

The road surface state obtaining device according to this form may employ the technical features described in any one of the above-described forms (1) through (17).

(20) The road surface state obtaining device according to the above form (18) or (19), wherein the one mark has a line shape not having two or more intersections.

Examples of the line shape not having two or more intersections include a shape of a straight line, a shape of a bent line (e.g., an L-shape), and a shape of a cross. In the case of the shape of a cross, one of the predetermined points may be defined as an intersection.

(21) The road surface state obtaining device according to the above form (18) or (19), wherein the one mark has a polygonal shape, and at least one of the plurality of points is respectively provided at least one of vertices of the polygonal shape.

(22) The road surface state obtaining device according to the above form (18) or (19), wherein the one mark has a shape having one closed region, and the plurality of points are provided on a line defining the closed region.

By providing the plurality of points on the line defining the closed region, a change in the relative positional relationship between the plurality of points can be obtained accurately. The mark may have a shape not including two or more closed regions.

(23) The road surface state obtaining device according to any one of the above forms (18) through (22), wherein two of the plurality of points are provided respectively on one end portion and another end portion of the one mark in a predetermined direction.

By setting the two of the plurality of points respectively at the one end portion and the other end portion in the predetermined direction, a relative positional relationship between these two points can be obtained satisfactorily. Examples of the predetermined direction include the front and rear direction and the right and left direction.

The plurality of points are preferably set such that a distance between the plurality of point images on the mark image contained in the picked-up image in the case where light is emitted to the reference road surface is longer than or equal to a set value. This is because the relative positional relationship can be determined more accurately in the case where the distance between the two point images is long than in the case where the distance between the two point images is short.

(24) A road surface state obtaining device, comprising:
an emitting device mounted on a vehicle body of a vehicle and configured to emit light such that the light impinges on a road surface to form at least one mark;
an imaging device mounted on the vehicle body and configured to form an image by taking an image of an image pickup object on a predetermined region containing the at least one mark formed on the road surface; and
an inclination state obtainer configured to obtain a magnitude of a gradient of the road surface based on a shape of a mark image corresponding to one mark of the at least one mark on the image formed by the imaging device.

The gradient of the road surface can be obtained by comparing the shape of the obtained mark image with a shape of a mark image obtained in the case where light is emitted to the reference road surface. The shape includes the size and the area of the mark image.

The road surface state obtaining device according to this form may employ the technical features described in any one of the forms (1) through (23).

(25) A suspension system, comprising:
the road surface state obtaining device according to any one of the above forms (1) through (24); and
a suspension control device configured to control at least one suspension for at least one control target wheel based on the inclination state of the road surface which is obtained by the road surface state obtaining device,
the road surface state obtaining device comprising a front-side road-surface-state obtainer configured to obtain an inclination state of a portion of the road surface which is located in front of the at least one control target wheel.

A feedforward (FF) skyhook control based on the road input is preferably executed. The FF skyhook control can suppress vibrations of the over-spring member which are generated due to the road input and suppress a roll moment and a pitch moment generated due to the road input.

(26) The suspension system according to the above form (25),
wherein a plurality of suspensions as the at least one suspension are provided respectively corresponding to front left and right and rear left and right wheels of the vehicle, and each of the plurality of suspensions comprises an actuator capable of controlling a vertical force acting between an under-spring member and an over-spring member, and
wherein the suspension control device comprises an actuator controller configured to control the actuator of at least one of the plurality of suspensions for the at least one control target wheel.

The actuator is provided for both of the suspension for the left wheel and the suspension for the right wheel in some case, or the actuators are provided individually for the suspensions for the respective front left and right and rear left and right wheels in another case. The vertical force to be controlled may be a damping force or a spring force (i.e., an elastic force).

For example, in the case (x) where each of the suspensions for the respective front left and right and rear left and right wheels includes a shock absorber, and a damping characteristic of the shock absorber is changeable, an electric motor or the like for changing the damping characteristic corresponds to the individual actuator.

In the case (y) where each of the suspensions for the respective front left and right and rear left and right wheels includes a vertical-force generating device different from the shock absorber or the spring, and a vertical force of the vertical-force generating device is controllable, an actuator for changing a magnitude and a direction of the vertical force corresponds to the individual actuator. For example, the vertical-force generating devices may include (a) an L-shaped bar including a shaft portion and an arm portion, one end portion of the arm portion being connected to a suspension arm, and the other end portion of the shaft being connected to the vehicle body, and (b) an electric motor configured to control a twist force of the shaft portion of the L-shaped bar. By controlling the twist force of the shaft portion of the L-shaped bar, the vertical force acting on the suspension arm via the arm portion is controlled.

In the case (z) where the suspension for the left wheel and the suspension for the right wheel on at least one of a front-wheel side and a rear-wheel side share a stabilizer bar device capable of controlling the roll suppressing force, an actuator for changing the roll suppressing force is an element shared by the suspension for the left wheel and the suspension for the right wheel. For example, the stabilizer bar device may include (i) a stabilizer bar whose one end portion is connected to the suspension arm for the left wheel and other end is connected to the suspension arm of the right wheel, the stabilizer bar held at its intermediate portion by the vehicle body swingably about an axis and (ii) an electric motor provided between one and the other portions into which the stabilizer bar is divided, the electric motor being capable of changing a relative phase between the one and the other portions, and an actuator for, e.g., the electric motor changes the relative phase between the one and the other portions of the stabilizer bar to suppress a force of the stabilizer bar for suppressing the roll.

(27) The suspension system according to the above form (26), wherein the actuator controller comprises a preview controller configured to, when the at least one control target wheel passes through an inclination-state obtainment object that is a portion of the road surface on which an inclination state is obtained by the road surface state obtaining device, control the actuator at a timing when the control one of the at least one suspension which corresponds to the left wheel and another of the at least one suspension which corresponds to the right wheel is actuated in accordance with the inclination state of the road surface.

For example, control command values may be output to the actuator after a time obtained by subtracting a preview compensation time τ from a previewable time (Lp/v) is elapsed from the image-pickup of the inclination-state obtainment object.

The previewable time (Lp/v) is a time between a point in time when an image of the inclination-state obtainment object is taken and a point in time when the control target wheel passes through the inclination-state obtainment object, and this previewable time is obtained by dividing a distance (i.e., a preview distance) Lp between the inclination-state obtainment object and the control target wheel by a running speed v of the vehicle.

The preview compensation time τ is longer in the case where a delay in the actuator is large than in the case where the delay in the actuator is small, and the preview compensation time τ is a time between an output of the control command values and a point in time when an actual amount of operation of the actuator is brought close to an amount of operation which is determined by the control command values. The control command values are preferably output the preview compensation time ti before the wheel passes through the inclination-state obtainment object.

As described above, there is a need that, by the time when the time (Lp/v–τ) is elapsed from the image-pickup of the inclination-state obtainment object, image processing is performed to obtain the inclination state of the road surface, and the control command values are produced. Thus, in the case where the delay in the actuator is large, and the preview compensation time τ is long, the preview distance Lp is preferably made longer, and a state of a portion of the road surface which is located as front as possible is preferably obtained. The processing area is preferably made narrow so as to speedily execute the image processing.

In the case where the delay in the actuator is small, on the other hand, a short preview distance Lp does not impose any inconvenience in the case where a time of the image processing is short. Thus, the state of the road surface under the vehicle body can be obtained, for example.

The passage through the inclination-state obtainment object includes a passage through a road surface whose inclination state is estimated to be the same as the inclination state determined for the inclination-state obtainment object. For example, in the case where front-rear or right-left gradients of portions of the road surface at a plurality of inclination-state obtainment objects located in front of the vehicle are obtained, and the suspension is controlled based on an average value of the gradients, it is possible to consider that the wheel is to pass through the road surface (i.e., the road surface with the average gradient) whose inclination state is estimated to be the same as the inclination state determined for the inclination-state obtainment object.

(28) The suspension system according to any one of the above forms (25) through (27), wherein the suspension control device comprises a vertical-vibration suppressing controller configured to, when the at least one control target wheel passes through an inclination-state obtainment object on the road surface, of which inclination state is obtained by the road surface state obtaining device, control the at least one suspension at a timing when a vibration of the vehicle body in an up and down direction due to a change in height position of the road surface is suppressed.

The over-spring member is vibrated when an under-spring force generated due to the change in height position of the road surface (which can be expressed as a road surface displacement or an amount of change in the road surface, for example) is transmitted to the over-spring member. However, controlling the suspension to reduce the under-spring force can reduce the under-spring force transmitted to the over-spring member, thereby satisfactorily suppressing the vibrations of the over-spring member. This suppression improves the ride comfort.

(29) The suspension system according to any one of the above forms (25) through (28),
wherein the at least one control target wheel is a left wheel and a right wheel,
wherein the road surface state obtaining device comprises a road-surface left-and-right-difference obtainer configured to obtain a difference in height between a left road surface portion that is a portion of the road surface which is located in front of the left wheel and a right road surface portion that is a portion of the road surface which is located in front of the right wheel, and
wherein the suspension control device comprises a roll suppressing controller configured to, when the left wheel passes through the left road surface portion, and the right wheel passes through the right road surface portion, control one of the at least one suspension which corresponds to the left wheel and another of the at least one suspension which corresponds to the right wheel at a timing when a roll moment estimated to act due to the difference in height of the road surface which is obtained by the road-surface left-and-right-difference obtainer is suppressed.

Based on the gradient of the road surface in the right and left direction (i.e., the widthwise direction), a difference in height of the road surface (i.e., a right and left difference in height of the road surface) between the inclination-state obtainment objects (i.e., the left road surface portion and the right road surface portion) through which the respective control target wheels (i.e., the left wheel and the right wheel) pass can be obtained, whereby the roll moment estimated to act due to the road input can be determined based on the right and left difference in height of the road surface.

(30) The suspension system according to any one of the above forms (25) through (29),
wherein the at least one control target wheel is a front wheel and a rear wheel,
wherein the road surface state obtaining device comprises a road-surface front-and-rear-difference obtainer configured to obtain a difference in height between a front road surface portion that is a portion of the road surface which is located in front of the front wheel and a rear road surface portion that is a portion of the road surface which is located in front of the rear wheel, and wherein the suspension control device comprises a pitch suppressing controller configured to, when the front wheel passes through the front road surface portion, and the rear wheel passes through the rear road surface portion, control one of the at least one suspension which corresponds to the front wheel and another of the at least one suspension which corresponds to the rear wheel at a timing when a pitch moment estimated to act due to the difference in height of the road surface which is obtained by the road-surface front-and-rear-difference obtainer is suppressed.

The height of the road surface can be obtained by cumulatively obtaining a road surface displacement based on the gradient in the front and rear direction.

BRIEF DESCRIPTION OF THE DRAWINGS

FIGS. 3(a) and 3(b) are maps obtained by the road surface state obtaining device, wherein FIG. 3(a) is a map representing a relationship between an inclination angle γ and a distance between two mark images in a longitudinal direction, and FIG. 3(b) is a map representing a relationship between an amount of change in the inclination angle γ and an amount of change in the distance between the two mark images in the longitudinal direction.

FIGS. 6(a) and 6(b) are maps obtained by the road surface state obtaining device, wherein FIG. 6(a) is a map representing a relationship between an inclination angle γ and a distance between two mark images in the longitudinal direction, and FIG. 6(b) is a map representing a relationship between an amount of change in the inclination angle γ and an amount of change in the distance between the two mark images in the longitudinal direction.

FIGS. 7(a)-7(c) are views each for explaining a preferable relative positional relationship between an emitting device and an imaging device in the road surface state obtaining device according to the one embodiment of the present invention, wherein FIG. 7(a) is a view illustrating a preferable relative positional relationship in the case where the road surface is flat, FIG. 7(b) is a view illustrating a preferable relative positional relationship in the case where the road surface is an ascending inclined surface, and FIG. 7(c) is a view illustrating a preferable relative positional relationship in the case where the road surface is a descending inclined surface.

FIGS. 8(a)-8(c) are views each for explaining another preferable relative positional relationship between the emitting device and the imaging device in the road surface state obtaining device according to the one embodiment of the present invention, wherein FIG. 8(a) is a view illustrating a preferable relative positional relationship in the case where the road surface is an ascending inclined surface, FIG. 8(b) is a view illustrating an area in which the mark image exists in the case where the road surface is flat, and FIG. 8(c) is a view illustrating a relationship between the area in which the mark image exists and the gradient of the road surface.

FIGS. 9(a)-9(c) are views each for explaining still another preferable relative positional relationship between the emitting device and the imaging device in the road surface state obtaining device according to the one embodiment of the present invention, wherein FIG. 9(a) is a view illustrating a preferable relative positional relationship in the case where the road surface is flat, FIG. 9(b) is a view illustrating a preferable relative positional relationship in the case where the road surface is an ascending inclined surface, and FIG. 9(c) is a view illustrating a preferable relative positional relationship in the case where the road surface is a descending inclined surface.

FIG. 23(a) is a flow chart illustrating a road-surface-gradient obtaining program stored in a storage device of a suspension ECU of the suspension system, FIG. 23(b) is a map representing a left-side gradient determination table, and FIG. 23(c) is a map representing a right-side gradient determination table.

EMBODIMENTS OF THE INVENTION

There will be first explained obtainment of a state of a road surface by a road surface state obtaining device according to one embodiment of the present invention and a relative positional relationship between an emitting device and an imaging device and thereafter explained a suspension system, according to one embodiment of the present invention, including the road surface state obtaining device according to the one embodiment of the present invention.

The road surface state obtaining device according to the present embodiment obtains a state of inclination of a road surface. Examples of this inclination state include a gradient and a state of change in the gradient. The gradient can be expressed by an angle of inclination or a value of tangent of the inclination angle, for example. In the following description, the inclination angle may be referred to as "gradient".

<Obtainment of Inclination State of Road Surface>

[Case Where Two Light Beams are Emitted]

The road surface state obtaining device includes an emitting device and an imaging device, and when two light beams parallel to each other are emitted from the emitting device to the road surface, the light beams impinge on the road surface, forming two marks each shaped like a spot. The imaging device picks up an image pickup object on a predetermined region containing the two marks to form an image. The inclination state of the road surface is obtained based on a relative positional relationship between images (hereinafter each referred to as "mark image") corresponding to the respective two marks contained in the picked-up image.

Figure 1:
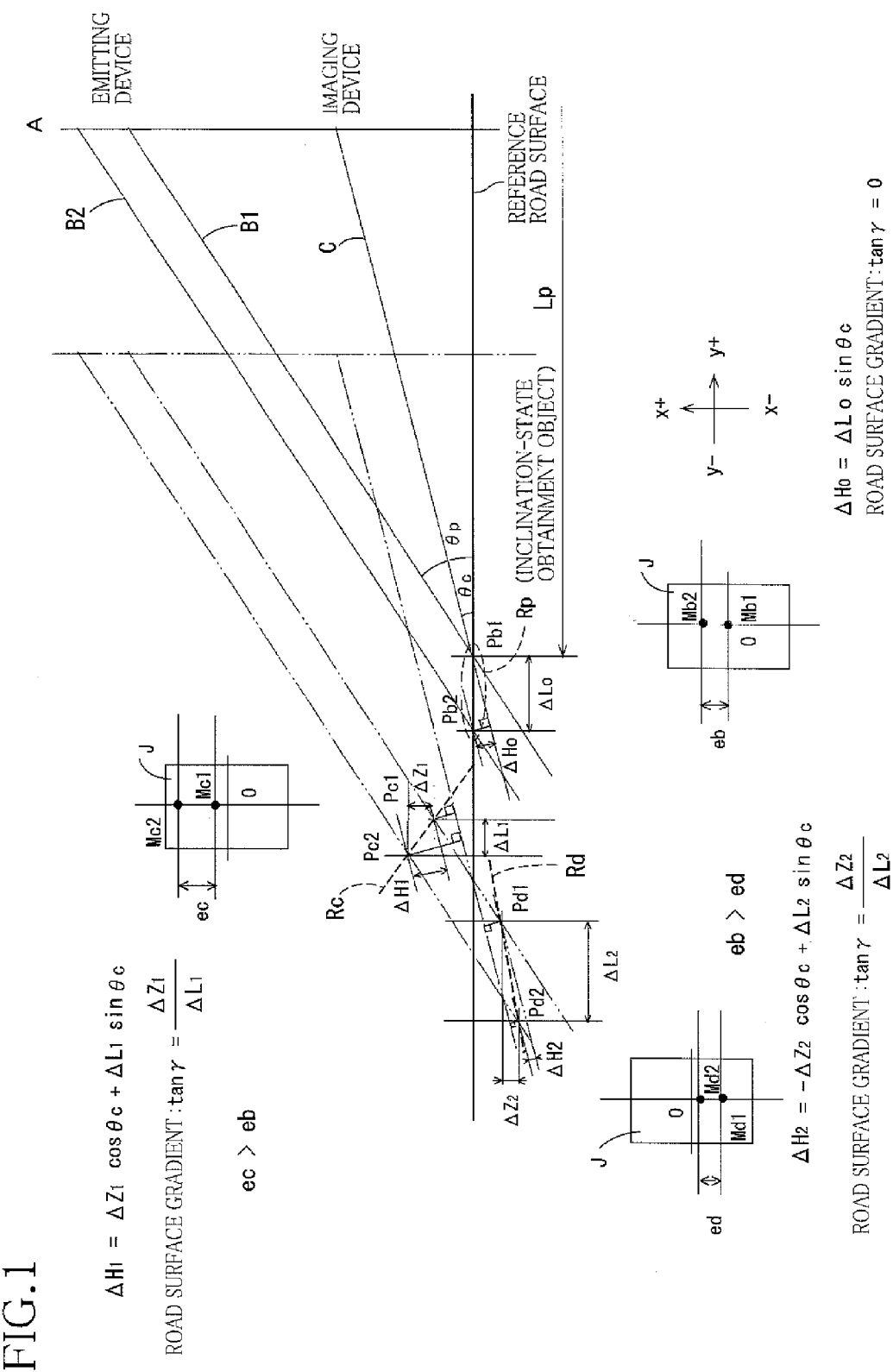
FIG. 1 is a view for explaining a principle of obtaining an inclination state of a road surface by a road surface state obtaining device according to one embodiment of the present invention.
Figure 5:
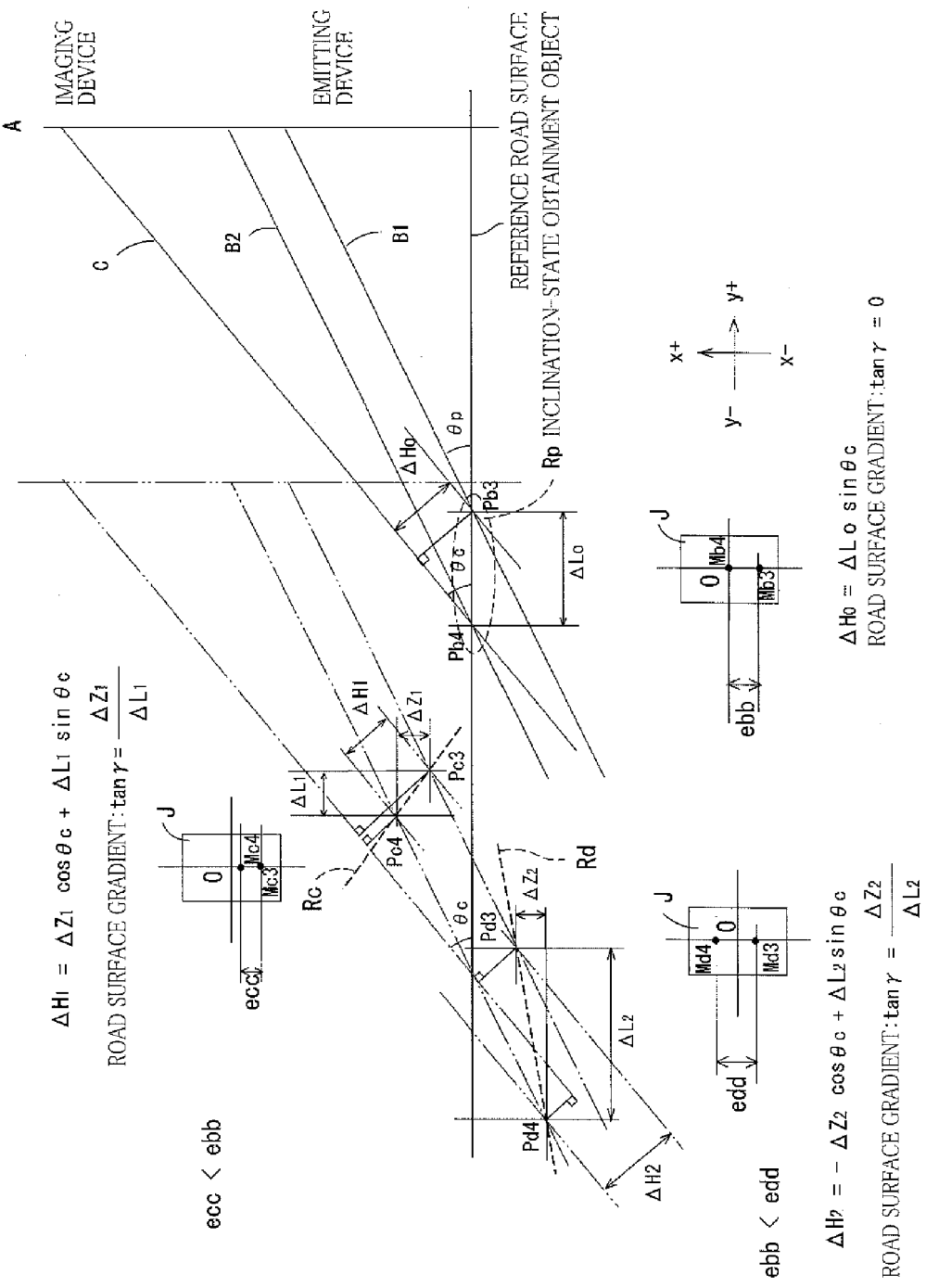
FIG. 5 is a view for explaining a principle of obtaining a road surface state by a road surface state obtaining device according to another embodiment of the present invention.

In the following description, as illustrated in FIGS. 1 and 5, an angle between the light beam B1 (B2) emitted from the emitting device and a reference road surface is referred to as "emission angle θp", and an angle between an axis C of the imaging device (e.g., a vertical axis of a lens of a camera) and the reference road surface is referred to as "camera angle θc". The reference road surface is a flat road surface whose road surface normal line coincides with a line A of a vehicle body which extends in the up and down direction, and front wheels and rear wheels of a vehicle contact the road surface. An area including the two marks on the road surface is a portion of the road surface on which the inclination state is to be obtained, namely, an inclination-state obtainment object Rp. Also, a distance between a single point on the inclination-state obtainment object Rp (e.g., a point at which the light beam B1 impinges on the road surface) and a point at which a control target wheel contacts the road surface is a preview distance Lp.

{Case of θp>θc}

As illustrated in FIG. 1, the emitting device and the imaging device are mounted on a front face of a front portion of the vehicle so as to have a relative positional relationship in which the emission angle θp is greater than the camera angle θc (θp>θc). For example, the emitting device and the imaging device are mounted such that the imaging device is located below the emitting device, and the light beam B1 that is one of the two light beams B1, B2 emitted from the emitting device and the axis C of the imaging device intersect each other on the reference road surface.

(i) Case where Gradient of Road Surface (hereinafter may be simply referred to as "gradient") is Zero The light beams B1, B2 emitted from the emitting device fall on a road surface in front of the vehicle, forming marks (spots) Pb1, Pb2. An image pickup object including the marks Pb1, Pb2 on a predetermined region is picked up by the imaging device to obtain a picked-up image J.

The picked-up image J contains mark images Mb1, Mb2 corresponding to the respective marks Ph1, Pb2. One of the mark images Mb1, Mb2 (the mark image Mb1) is located at a reference position O on the picked-up image J. The reference position O on the reference road surface corresponds to a position through which the axis C passes.

On the picked-up image J, a longitudinal distance eb between the two mark images Mb1, Mb2 is obtained. The distance eb between the mark images Mb1, Mb2 on the picked-up image J is a value corresponding to a distance ΔH0. The distance ΔH0 is a distance between the axis C of the imaging device and the mark Pb2 on the road surface and expressed by the following equation:

$$\Delta H0 = \Delta L0 \cdot \sin \theta c$$

The distance ΔL0 is a predetermined value representing a distance between two light beams B1, B2 when the light beams B1, B2 parallel to each other are emitted to the reference road surface. The distance ΔL0 can be set based on a cycle of calculation of a running speed of the vehicle and a road surface state. For example, the distance ΔL0 can be set to a value which does not cause two inclination-state obtainment objects Rp to overlap each other even when the running speed of the vehicle is a set speed.

A longitudinal direction is an x direction on the picked-up image J and corresponds to a front and rear direction, i.e., a longitudinal direction of the vehicle (or an up and down direction) when the vehicle is viewed from the imaging device. A lateral direction is a y direction on the picked-up image and corresponds to a widthwise direction (i.e., a right and left direction) of the vehicle when viewed from the imaging device.

(ii) Case where Gradient of Road Surface is Positive

An ascending inclined surface Re will be referred to as "road surface with positive gradient γ" (γ>0).

When the light beams B1, B2 impinge on the road surface Rc with positive gradient γ, marks Pc1, Pc2 are formed, and a picked-up image J containing mark images Mc1, Mc2 is obtained. A distance ec between the mark images Mc1, Mc2 is a value corresponding to a distance ΔH1. On the picked-up image J, the mark images Mc1, Mc2 are located on an x+ side of the reference position O.

The distance ΔH1 is expressed by the following equation:

$$\Delta H1 = \Delta Z1 \cdot \cos\theta c + \Delta L1 \cdot \sin\theta c$$

The above ΔZ1 represents a difference in height between two locations on the road surface on which the respective marks Pc1, Pc2 are formed, and the above ΔL1 represents a distance between the two locations on the road surface on which the respective marks Pc1, Pc2 are formed, in a direction parallel with the reference road surface. The gradient γ of the road surface of the inclination-state obtainment object Rp is expressed by the following equation:

$$\gamma 1 = \Delta Z1/L1$$

The figure shows that the distance ec is greater than the distance eb.

(iii) Case where Gradient of Road Surface is Negative

A descending inclined surface Rd will be referred to as "road surface with negative gradient γ" (γ<0).

When the light beams B1, B2 impinge on the road surface Rd with negative gradient γ, marks Pd1, Pd2 are formed, and a picked-up image J containing mark images Md1, Md2 is formed. A distance ed between the two mark images Md1, Md2 is a value related to a distance ΔH2. The mark images Md1, Md2 on the picked-up image J are located on an x− side of the reference position O.

The distance ΔH2 is expressed by the following equation:

$$\Delta H2 = -\Delta Z2 \cos\theta c + \Delta L2 \cdot \sin\theta c$$

The figure shows that the distance ed is less than each of the distance eb and the distance ec.

Figure 2:
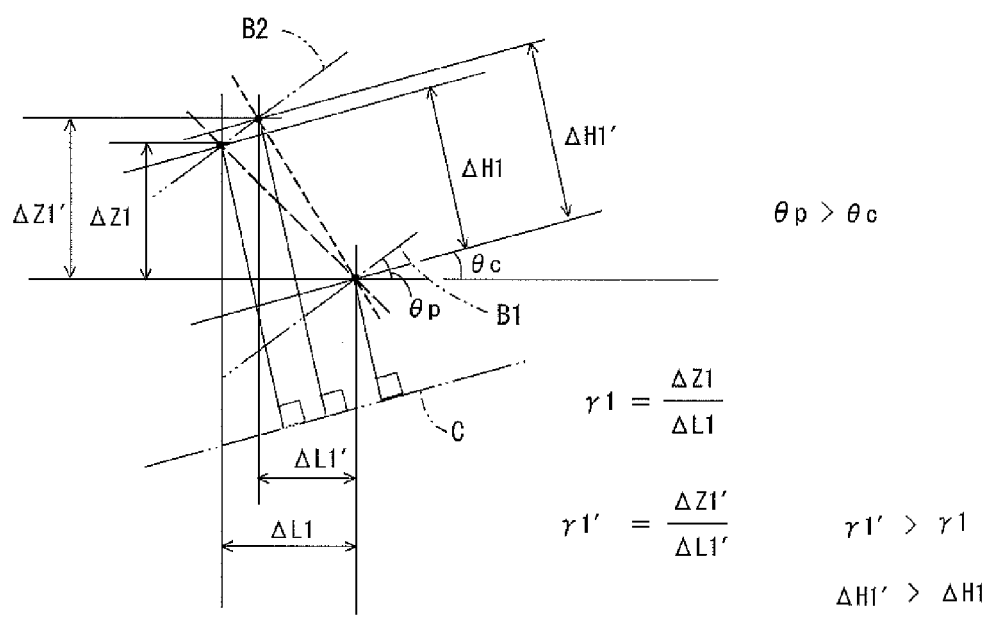
FIG. 2 is a view illustrating a part of FIG. 1.

(iv) Relationship between Gradient γ and Longitudinal Distance e between Two Mark Images As illustrated in FIG. 2, the emission angle θp between the light beams B1, B2 is greater than the camera angle θc of the axis C of the imaging device. Thus, it is obvious that the distance ΔH1 increases with increase in a value of the gradient γ (γ<γ', ΔH1<ΔH1') in the case where the gradient γ of the road surface (i.e., the inclination angle) is positive (γ>0).

This applies to the case where the gradient γ is negative, and the distance ΔH2 increases with increase in the gradient γ (i.e., decrease in its absolute value), which increases a longitudinal distance e.

FIG. 3(a) illustrates one example of a relationship between the gradient γ of the road surface (i.e., the inclination angle) and a distance e between two mark images, which relationship is obtained by a simulation in the case where each of the camera angle θc and the emission angle θp is set to a value obtained in the case where the present road surface state obtaining device is mounted on the vehicle. As illustrated in FIG. 3(a), the gradient γ is greater in the case where the distance e is long than in the case where the distance e is short, and the distance e and the gradient γ are in one-to-one correspondence relationship. Accordingly, once the distance e is determined, the gradient γ is determined uniquely.

FIG. 3(b) illustrates a relationship between a change Δγ of the gradient γ and a change Δe of the distance e. FIG. 3(b) shows that a ratio of the amount Δe of change in the distance e to the amount Δγ of change in the gradient γ (Δe/Δγ which hereinafter referred to as "distance change ratio") is larger in the case where the gradient γ is negative (γ<0) than in the case where the gradient γ is positive (γ>0).

Tables representing the respective relationships illustrated in FIGS. 3(a) and 3(b) (namely, a gradient determination table and a gradient-change-amount determination table) is obtained in advance and stored in a storage device.

(v) Consideration

Each of the emission angle θp and the camera angle θc is considered in a range in which the emission angle θp is greater than the camera angle θc (θp>θc).

(v-1) Consideration of Case where Emission Angle θp is 90° (θp=90°)

Regardless of the value of the gradient γ of the road surface, in this case, each of the distances ΔL1, ΔL2 between the two marks formed on the road surface in a direction parallel with the reference road surface is equal to a distance ΔL0 established in the case where the gradient γ of the road surface is zero (ΔL1=ΔL0, ΔL2=ΔL0). Thus, when compared with the case where the emission angle θp is less than 90° (θp<90°), the distance e in the case where the gradient γ of the road surface is positive is large, and the distance e in the case where the gradient γ of the road surface is negative is small.

Figure 4:
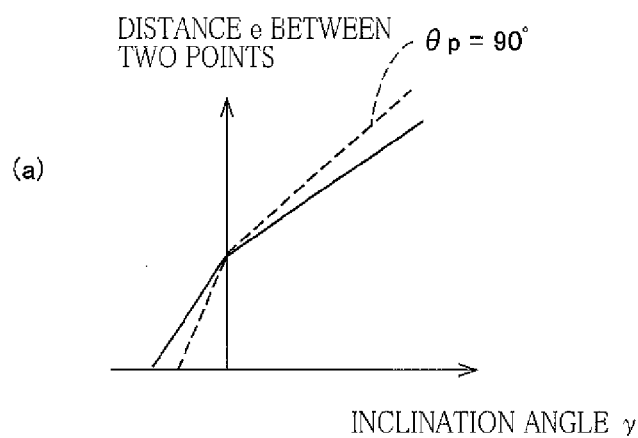
FIG. 4(a) is a map obtained by another road surface state obtaining device different from the road surface state obtaining device and representing a relationship between the inclination angle γ and a distance between two mark images in a longitudinal direction.
FIG. 4(b) is a map obtained by still another road surface state obtaining device different from the road surface state obtaining device and representing a relationship between the inclination angle γ and the distance between the two mark images in the longitudinal direction.
Figure 4:
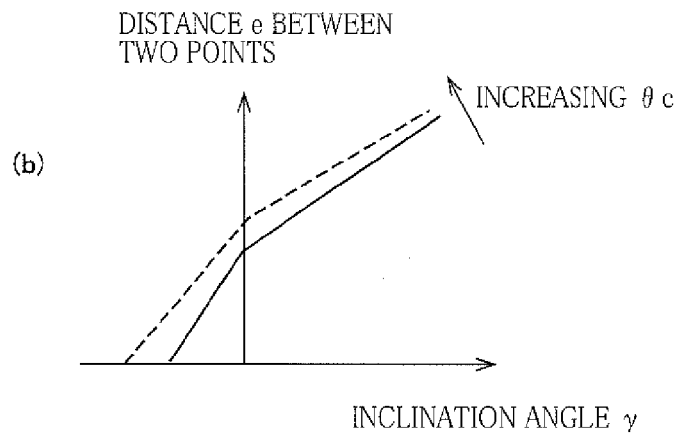

As illustrated in FIG. 4(a), in the case where the emission angle θp is 90°, the gradient γ of the road surface (i.e., the inclination angle) and the distance e have a relationship indicated by the broken line which indicates that a maximum value of an absolute value of the gradient γ obtainable in the case where the gradient γ is negative is small when compared with a relationship indicated by a solid line indicating the case where the emission angle θp is less than 90°.

(v-2) Consideration of Case where Camera Angle θc is Increased

Increase in the camera angle θc increases sin θc and reduces cos θc. If the camera angle θc is increased to a value equal to the emission angle θp (θc=θp), the distance e is constant regardless of the value of the gradient γ of the road surface. In view of the above, the increase in the camera angle θc reduces the distance change ratio and reduces a difference in the distance change ratio (Δe/Δγ) between the case where the gradient γ of the road surface is positive (γ>0) and the case where the gradient γ of the road surface is negative (γ<0).

As illustrated in FIG. 4(b), in the case where the camera angle θc is large, a relationship indicated by the broken line is satisfied, and a minimum value of the obtainable gradient γ of the road surface (i.e., the inclination angle) can be reduced (in other words, an absolute value of the gradient γ in the case where the gradient γ is negative can be increased) when compared with a relationship indicated by the solid line indicating the case where the camera angle θc is small.

{Case of θp<θc}

As illustrated in FIG. 5, the emitting device and the imaging device are mounted on the front face of the front portion of the vehicle so as to have a relative positional relationship in which the emission angle θp is less than the camera angle θc (θp<θc). For example, the emitting device and the imaging device are mounted such that the imaging device is located above the emitting device, and the light beam B2 that is one of the two light beams B1, B2 emitted from the emitting device and the axis C of the imaging device intersect each other on the reference road surface.

(i) Case where Gradient γ of Road Surface is Zero

When the light beams B1, B2 impinge on the reference road surface, marks Pb3, Pb4 are formed, and a picked-up image J containing mark images Mb3, Mb4 is obtained. The mark Pb4 intersects the axis C on the road surface, and accordingly the mark image Mb4 is located at the reference position O on the picked-up image J.

A distance ebb between the mark images Mb3, Mb4 on the picked-up image J (i.e., the distance between the mark images Mb3, Mb4 in the longitudinal direction) is a value related to the distance $\Delta H0$ ($\Delta H0 = \Delta L0 \sin \theta c$).

(ii) Case where Gradient $\gamma$ of Road Surface is Positive

When the light beams B1, B2 impinge on the road surface Re with a positive gradient $\gamma$, marks Pc3, Pc4 are formed, and a picked-up image J containing mark images Mc3, Mc4 is formed. A distance ecc between the mark images Mc3, Mc4 (i.e., the distance therebetween in the longitudinal direction) is a length corresponding to the distance $\Delta H1$. On the picked-up image J, the mark images Mc3, Mc4 are located on an x− side of the reference position O.

The distance $\Delta H1$ is expressed by the following equation:

$$\Delta H1 = \Delta Z1 \cos \theta c + \Delta L1 \cdot \sin \theta c$$

The gradient $\gamma$ of the road surface between the two locations is expressed by the following equation:

$$\gamma 1 = \Delta Z1/L1$$

(iii) Case where Gradient of Road Surface is Negative

When the light beams B1, B2 impinge on the road surface Rd with a negative gradient $\gamma$, marks Pd3, Pd4 are formed, and a picked-up image J containing mark images Md3, Md4 is formed, A distance edd between the mark images Md3, Md4 is a value related to the distance $\Delta H2$. The mark image Md3 is located on an x− side of the reference position O, and the mark image Md4 is located on an x+ side of the reference position O.

The distance $\Delta H2$ is expressed by the following equation:

$$\Delta H2 = -\Delta Z2 \cdot \cos \theta c \, \Delta L2 \sin \theta c$$

Figure 6:
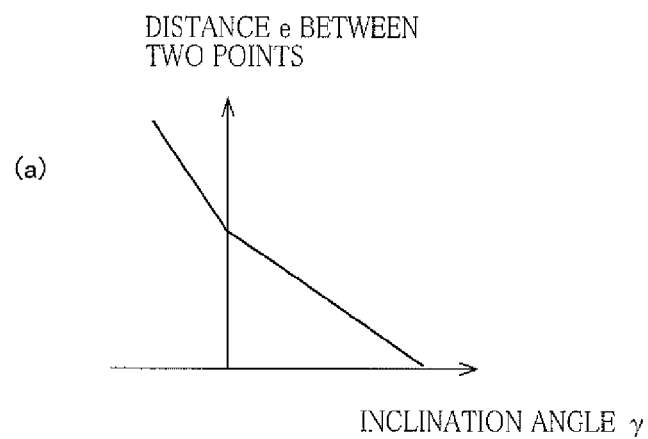
Figure 6:
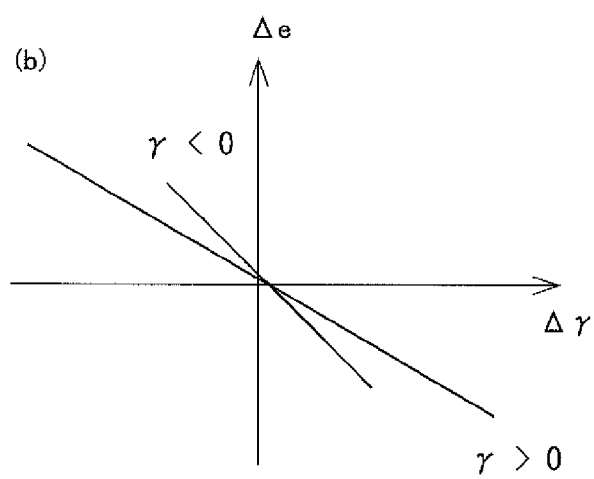

(iv) Relationship between Gradient $\gamma$ of Road Surface and Distance e between Two Mark Images FIG. 6(a) illustrates one example of a relationship, obtained by a simulation, between the gradient $\gamma$ of the road surface and the distance e between the two mark images. As illustrated in FIG. 6(a), the gradient (i.e., the inclination angle) $\gamma$ is smaller in the case where the distance e is long than in the case where the distance e is short. Since the distance e and the gradient $\gamma$ are in one-to-one correspondence relationship, once the distance e is determined, the gradient $\gamma$ can be obtained.

FIG. 6(b) illustrates a relationship between an amount of change in the distance e and an amount of change in the gradient $\gamma$. As illustrated in FIG. 6(b), the absolute value of the distance change ratio is larger in the case where the gradient (i.e., the inclination angle) $\gamma$ is negative ($\gamma<0$) than in the case where the gradient (i.e., the inclination angle) $\gamma$ is positive ($\gamma>0$).

As described above, in the case where a relationship in magnitude between the emission angle $\theta p$ and the camera angle $\theta c$ is reversed, a relationship between the distance e and the gradient $\gamma$ is also reversed, but in any case, the distance e and the gradient $\gamma$ are in one-to-one correspondence relationship. Accordingly, it is obvious that once the distance e is determined, the gradient $\gamma$ is determined uniquely.

[Case where Single Light is Emitted to Form Mark Having Line Shape, Polygonal Shape, or the Like]

While a single light beam is emitted from the emitting device of the road surface state obtaining device, the shape of a mark formed on the road surface by the light beam is not limited to a spot shape and may be a line shape, a polygonal shape, or the like. The inclination state of the road surface is obtained based on the shape, the size (i.e., a relative positional relationship between two points on the mark), and so on of the mark image contained in the picked-up image.

Since the shape of the mark formed on the road surface corresponds to the shape of the mark image contained in the picked-up image J, the following explanation is provided for the shape of the mark image contained in the picked-up image J.

The mark formed on the road surface by the emitted light has a line shape extending in the front and rear direction of the vehicle, and two points are defined at opposite ends of the line shape in the front and rear direction.

In FIG. 11(a), a mark image Ma1 corresponding to the mark has the line shape extending in the longitudinal direction. The gradient of the road surface in the front and rear direction is obtained based on a distance, in the longitudinal direction, between point images Q1, Q2 respectively corresponding to the two points, i.e., the length of the mark image Ma1 in the longitudinal direction.

The length of the mark image Ma1 in the longitudinal direction (i.e., the distance between the point images Q1, Q2 in the longitudinal direction) on the reference road surface ($\gamma=\gamma 0$) is defined as e1.

As illustrated in FIG. 1, in the case where the emission angle $\theta p$ is greater than the camera angle $\theta c$ ($\theta p>\theta c$), the larger gradient $\gamma$ of the road surface is obtained in the case where the length of the mark image Ma1 (i.e., the distance between the one end portion Q1 and the other end portion Q2 in the longitudinal direction) is long than in the case where the length of the mark image Ma1 is short (e1a>e1, $\gamma a>\gamma 0$). As illustrated in FIG. 5, in the case where the emission angle $\theta p$ is less than the camera angle $\theta c$ ($\theta p<\theta c$), the larger gradient $\gamma$ of the road surface is obtained in the case where the distance is short than in the case where the distance is long (e1>e1a', $\gamma a'>\gamma 0$).

The mark formed on the road surface has the line shape extending in the longitudinal direction (or the widthwise direction) of the vehicle, and opposite ends of the line shape in the front and rear direction respectively serve as the two points.

FIG. 11(b) illustrates a mark image Ma2 having a line shape extending in the lateral direction, and the gradient $\alpha$ (i.e., the cant) of the road surface in the right and left direction is obtained based on a distance between point images PL, PR respectively corresponding to the two points in the longitudinal direction.

In the case where the gradient $\alpha$ of the road surface in the right and left direction is zero, the distance between the right end portion PR and the left end portion PL of the mark image in the longitudinal direction is substantially zero.

In the case where the right end portion PR of the mark image Ma2 is located on an x+ side of the left end portion PL, a right portion of the mark on the road surface is higher than its left portion in height of the road surface in the case illustrated in FIG. 1 ($\theta p>\theta c$). In this case, the road surface inclines such that its height increases from the left side to the right side, and the larger gradient $\alpha$ is obtained in the case where a longitudinal distance e2a of the mark image Ma2 is long than in the case where the longitudinal distance (length) e2a of the mark image Ma2 is short. In the case where the right end portion PR of the mark image Ma2 is located on an x− side of the left end portion FL, the road surface inclines such that its height increases from the right side to the left side in the case illustrated in FIG. 1 ($\theta p>\theta c$), and the larger gradient is obtained in the case where a longitudinal distance (length) e2a of an mark image Ma2 is long than in the case where the longitudinal distance e2a of the mark image Ma2 is short.

For example, assuming that a distance e2a is set to a positive value, and a distance e2a' is set to a negative value and that an inclination angle θ, in the right and left direction, in a direction in which the right portion of the road surface is higher than its left portion is set to a positive value, and an inclination angle α in a direction in which the left portion of the road surface is lower than its right portion is set to a negative value, the distance and the inclination angle α have a relationship in which the inclination angle α is larger in the case where the distance is long than in the case where the distance is short.

It is noted that this applies to the case where two light beams parallel to each other are emitted so as to be spaced apart from each other in the right and left direction.

Also, in the case where a length or distance Ly2 (Ly2') between the right end portion PR of the mark image Ma2 and its left end portion PL is long, the larger gradient α in a direction of the length may be obtained than in the case where the length is short.

FIG. 11(c) illustrates, as another example, a mark image having a shape including a portion extending in the longitudinal direction and a portion extending in the lateral direction, i.e., a shape formed by combination of the mark image Ma1 and the mark image Ma2. Examples of such a mark image include a mark image Ma3 having a shape of a cross and a mark image Ma3' having an L-shape. In any image, both of the gradient γ of the road surface in the front and rear direction and the gradient α in the right and left direction can be obtained.

In the case where the mark formed on the road surface has the rhombus shape, its vertices may be defined as a plurality of points.

FIG. 11(d) illustrates, as another example, a mark image Ma4 formed in a rhombus shape having vertices. A point image corresponding to a point of an upper end of the vertices is a point image QU, a point image corresponding to a point of a lower end of the vertices is a point image QD, a point image corresponding to a point of a left end of the vertices is a point image QL, and a point image corresponding to a point of a right end of the vertices is a point image QR.

The gradient γ of the road surface in the front and rear direction is obtained based on a relative positional relationship between the point images QU, QD, and the gradient α of the road surface in the right and left direction is obtained based on a relative positional relationship between the point images QL, QR.

For example, the larger gradient γ of the road surface in the front and rear direction (e3a>e3, γ>0) is obtained in the case where a distance e3 between the point image QD and the point image QU is long than in the case where the distance e3 between the point image QD and the point image QU is short (in the case of "θp>θc"). In other words, the larger gradient γ is obtained in the case where the length of the mark image Ma4 having the rhombus shape in the longitudinal direction, i.e., the length of a diagonal line Th1 is long than in the case where the length of the mark image Ma4 is short.

In the case where the point image QL and the point image QR are different from each other in position in the front and rear direction, the road surface inclines in the right and left direction. The larger gradient α of the road surface in the right and left direction is obtained in the case where a distance (i.e., a difference) e4 between the point image QL and the point image QR in the longitudinal direction is long than in the case where the distance e4 is short. Also, the larger gradient α may be obtained in the case where the length or distance Ly between the point image QL and the point image QR (i.e., the length of the diagonal line Th2) is long than in the case where the length Ly is short.

Figure 11:
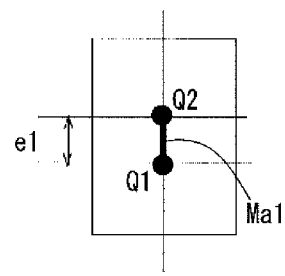
FIGS. 11(a)-11(d) are views each illustrating picked-up images picked up by the imaging device of the road surface state obtaining device according to the one embodiment of the present invention and illustrating one example of a shape of a mark image which can be employed in the road surface state obtaining device according to the present embodiment.
Figure 11:
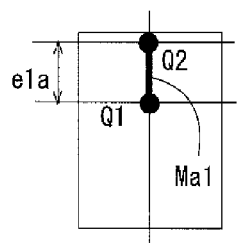
Figure 11:
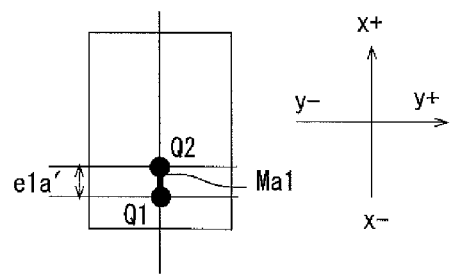
Figure 11:
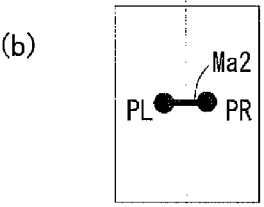
Figure 11:
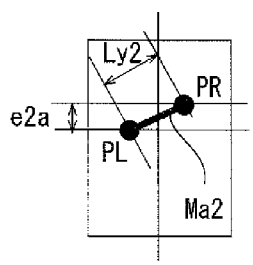
Figure 11:
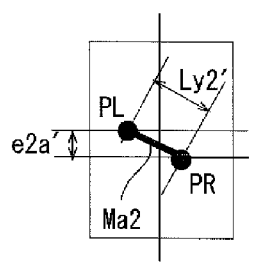
Figure 11:
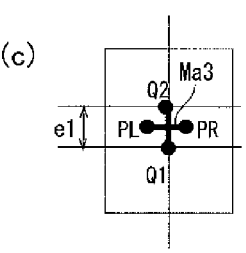
Figure 11:
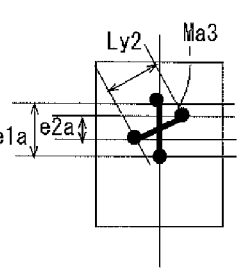
Figure 11:
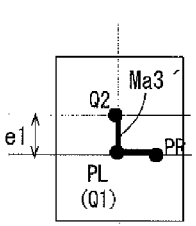
Figure 11:
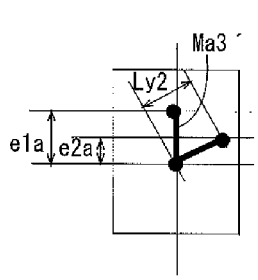
Figure 11:
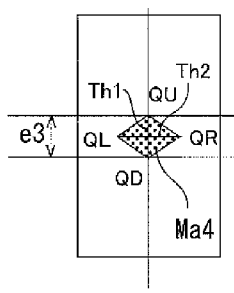
Figure 11:
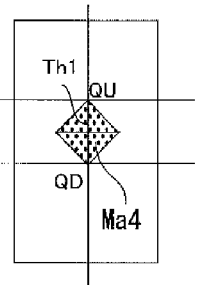
Figure 11:
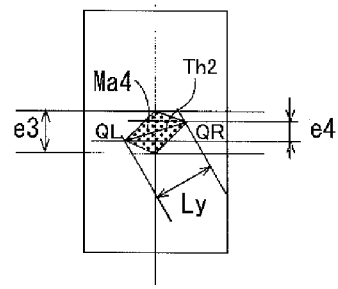

It is noted that the shape of the mark image is not limited to the examples illustrated in FIG. 11. The mark image may have any image whose outer shape can be defined by a continuous line such as a round shape, an oval shape, and a polygonal shape.

The gradient α in the right and left direction can be obtained in the same manner in a case where two light beams each for forming the mark image are emitted respectively to positions corresponding respectively to the one end portion PL and the other end portion PR of the mark image Mat.

The gradient γ in the front and rear direction and the gradient α in the right and left direction can be obtained in the same manner in the case where four light beams each for forming the mark image are emitted respectively to positions corresponding respectively to the end portions PL, PR, Q1, Q2 of the mark image Ma3.

Figure 22:
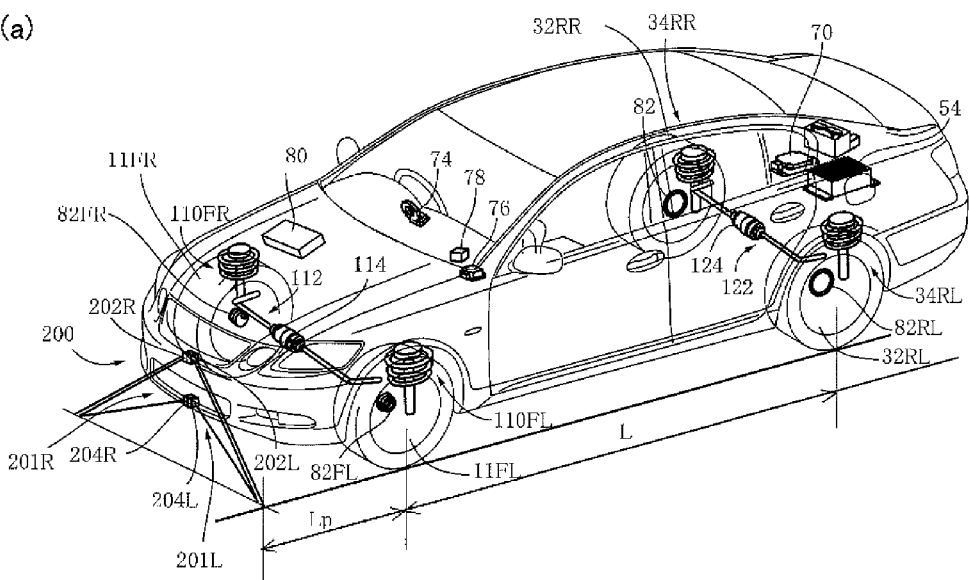
FIG. 22(a) is a view schematically illustrating an entire vehicle including a suspension system according to Embodiment 4 of the present invention, and this suspension system includes a road surface state obtaining device according to another embodiment of the present invention.
FIG. 22(b) is a view illustrating picked-up images in the case where parallel light beams are emitted to a reference road surface.
FIG. 22(c) is a view illustrating picked-up images in the case where parallel light beams are emitted to a road surface whose right side is higher than its left side.
FIG. 22(d) is a view illustrating picked-up images in the case where parallel light beams are emitted to a road surface whose left side is higher than its right side.
Figure 22:
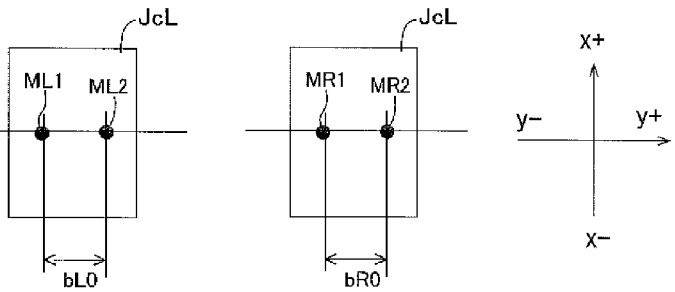
Figure 22:
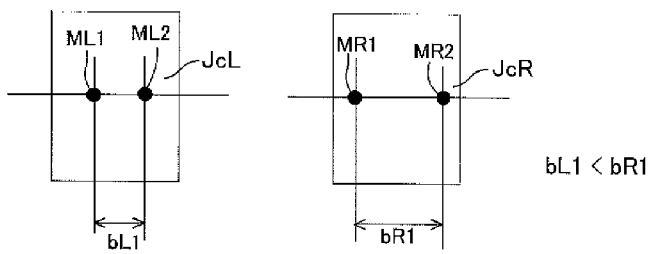
Figure 22:
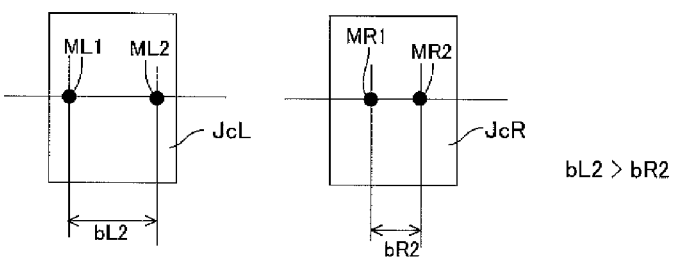

While the explanation has been provided for the case where the light is emitted in the front and rear direction of the vehicle, and the axis of the imaging device extends in the front and rear direction of the vehicle, the case where the light is emitted in the right and left direction, and the axis of the imaging device extends in the right and left direction will be explained later with reference to FIG. 22.

<Relative Positions of Emitting Device and Imaging Device>

$$[\theta p \geq (90° - \gamma ap), \theta p < \theta c]$$

$$[\theta p \geq (90° - \gamma ap), \theta p > \theta c]$$

The emitting device and the imaging device are preferably mounted in a relative positional relationship in which the imaging device reliably receives light emitted from the emitting device and reflected from the road surface based on the reflectivity of the road surface.

As illustrated in FIGS. 7(a) and 9(a), in the case where light is emitted and reflected from the road surface, an incident angle Gin and a reflection angle Gout are equal to each other (θin=θout). Thus, the emitting device and the imaging device are preferably mounted so as to be symmetric with respect to a road surface normal line. In the case where the emitting device and the imaging device are not mounted so as to be symmetric with respect to the road surface normal line, as illustrated in FIGS. 7(b), 7(c), 9(b), and 9(c), the imaging device is preferably mounted on a side on which the light emitted from the emitting device is reflected from the road surface. FIGS. 7(b) and 7(c) illustrate the case where the emission angle θp is greater than or equal to the inclination angle of the gradient (i.e., the maximum gradient) γap with respect to the normal line of the road surface (90°−γap) (the emitting device is in a rearward inclining attitude in most cases), and the camera angle θc is less than the emission angle θp (θp>θc). FIGS. 9(b) and 9(c) illustrate the case where the emission angle θp of the light beam is less than or equal to the angle of the gradient γap with respect to the road surface normal line (90°−γap) (the emitting device is in a frontward inclining attitude in most cases), and the camera angle θc is greater than the emission angle θp (θc>θp).

When the road surface with positive gradient γ and the road surface with negative gradient γ are compared with each other, the suspension control is more necessary for the road surface with positive gradient γ than for the road surface with negative gradient γ. In the case where the road surface descends and then ascends, the change in height position of the road surface (i.e., a road surface displacement) is easily absorbed by extension of springs. In the case where the road surface ascends and then descends, however, the change in height position of the road surface is not absorbed, and a road input is easily transmitted to an over-spring member. Accordingly, it is preferable that the gradient γ of the road surface in the case where the road surface ascends and then descends is reliably obtained, and the emitting device and the imaging device are preferably mounted in the relative positional relationship illustrated in FIGS. 7(*b*) and 9(*b*).

Figure 7:
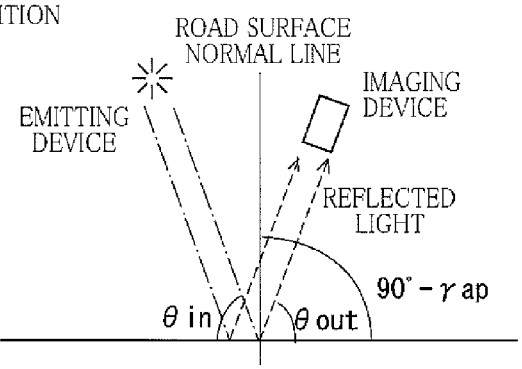
Figure 7:
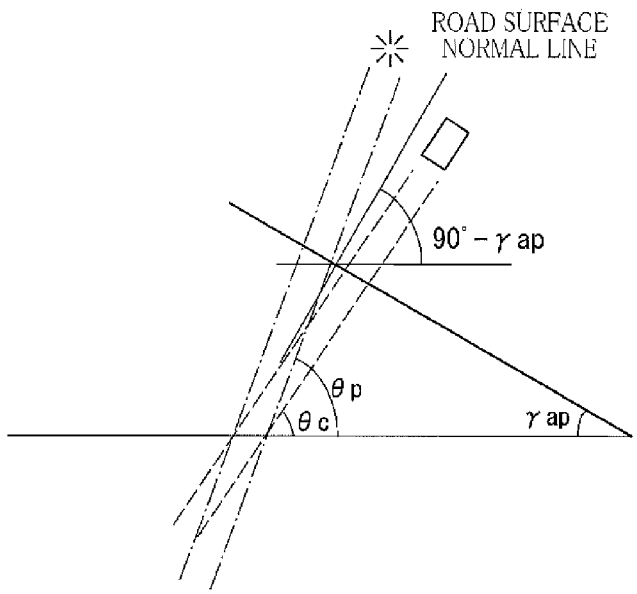
Figure 7:
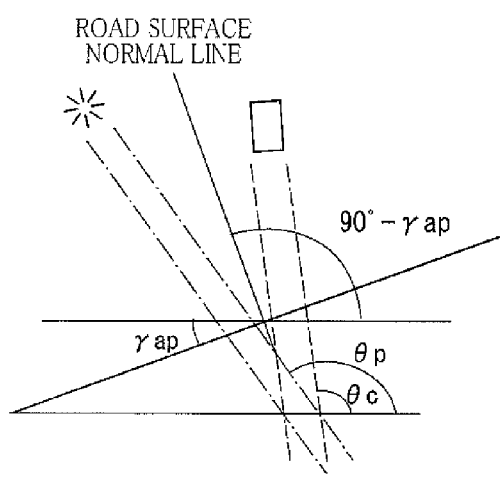
Figure 9:
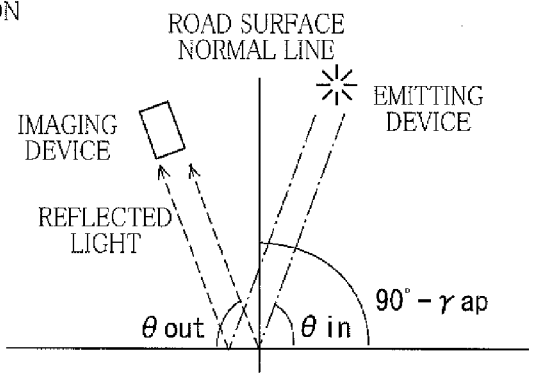
Figure 9:
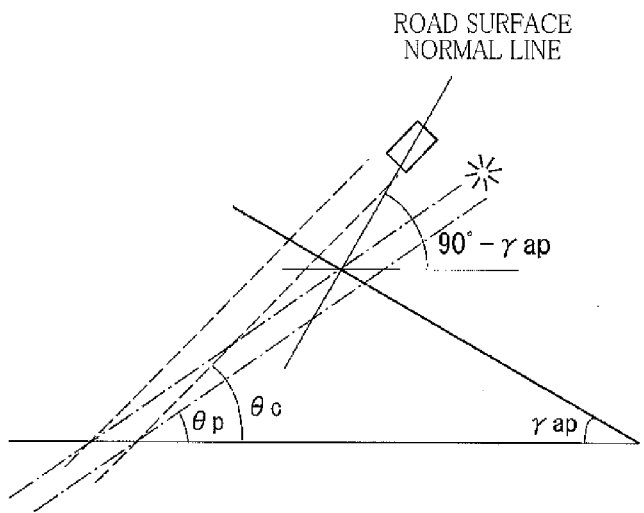
Figure 9:
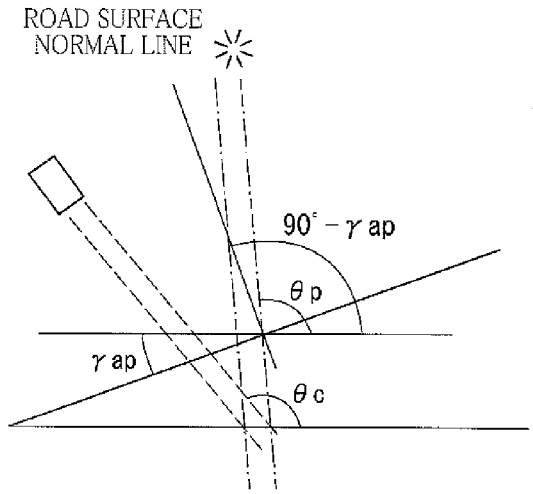

It is noted that each of a lower limit value of the camera angle θc in the cases illustrated in FIGS. 7(*b*) and 7(*c*) and an upper limit value of the camera angle θc in the cases illustrated in FIGS. 9(*b*) and 9(*c*) may be determined based on a condition that a difference between the emission angle θp and the camera angle θc is less than 90° and may be determined based on a condition that a processing area is not larger than a predetermined area.

[θp>θc]

Figure 8:
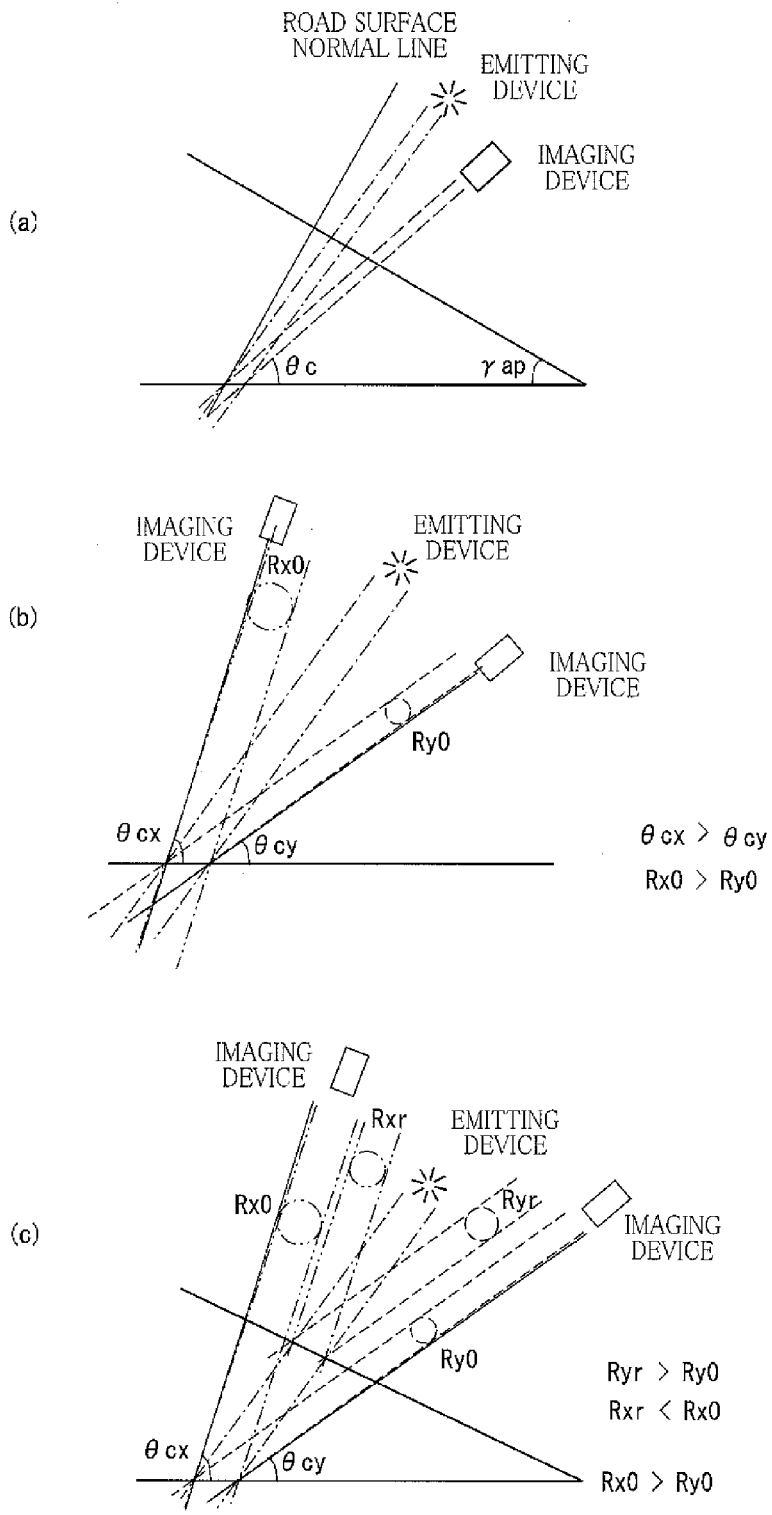

As illustrated in FIG. 8(*a*), the emitting device and the imaging device may be mounted in a state in which the camera angle θc is less than the emission angle Op (θc<θp) regardless of the value of the angle between the emission angle θp and the road surface normal line (90°−γap).

(a) In the case where the emission angle θp and the camera angle θc are made smaller, the gradient of the road surface (i.e., an inclination-state obtainment object) in front of the vehicle can be obtained, making it possible to increase the preview distance Lp. For example, it is possible to consider that the camera angle θc only needs to be the sum of an angle determined by a response of an actuator (i.e., an angle determined by a vertical displacement of an under-spring member controllable per unit time) and a maximum value δpmax of an inclination angle in a direction of a pitch of the vehicle body.

(b) In the case where the camera angle θc is made less than the emission angle θp (θc<θp), it is possible to narrow a processing area (i.e., a cutout area) in the case where the vehicle runs on a substantially flat road surface.

As illustrated in FIG. 8(*b*), an area Ry0 on which two mark images exist in the case where the camera angle θc is less than the emission angle θp (θc<θp) is narrower than an area Rx0 on which two mark images exist in the case where the camera angle θc is greater than the emission angle θp (θc>θp) and where the gradient γ of the road surface is zero (Ry0<Rx0). Accordingly, making the camera angle θc less than the emission angle θp (θc<θp) can narrow the cutout area, making it possible to reduce a time required for processing in most cases during running of the vehicle. Since the mark image is located near the reference position, an accuracy of detecting the position of the mark image is high.

(c) In the case where the camera angle θc is less than the emission angle θp (θc<θp), the cutout area is larger in the case where the gradient γ is large than in the case where the gradient γ is small.

As illustrated in FIG. 8(*c*), in the case where the camera angle θc is greater than the emission angle θp (θc>θp), an area Rxr on which two mark images exist in the case where the gradient γ of the road surface is greater than zero is smaller than the area Rx0 on which two mark images exist in the case where the gradient γ of the road surface is zero (Rxr<Rx0), but in the case where the camera angle θc is less than the emission angle θp (θc<θp), an area Ryr on which two mark images exist in the case where the gradient γ of the road surface is greater than zero is larger than the area Rx0 on which two mark images exist in the case where the gradient γ of the road surface is zero (Ryr>Ry0). Accordingly, a direction of change is the same between an increase in the gradient γ and an increase in the cutout area, facilitating determining the cutout area in a relationship with the gradient γ.

[θc>γap+δpmax,θp>γap+δpmax]

Figure 10:
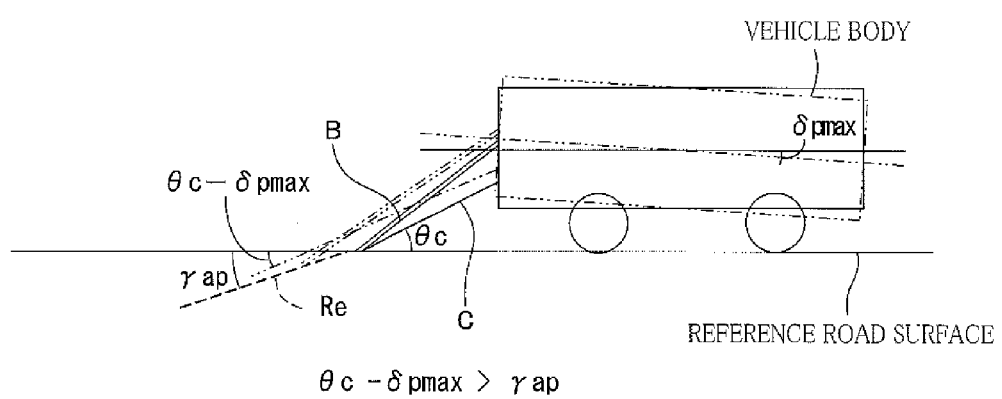
FIG. 10 is a view for explaining a preferable relative positional relationship between the emitting device and the imaging device in the road surface state obtaining device according to the one embodiment of the present invention.

As illustrated in FIG. 10, each of the camera angle θc and the emission angle θp is greater than the sum of a maximum value γap of an approach angle and a maximum value δpmax of an inclination angle (i.e., a pitch angle) of the vehicle body.

If the emission angle θp is less than or equal to the sum (γap+δpmax), and the vehicle body is inclined by the angle δpmax, an inclined surface Re with the descending gradient γap and the light beam B become parallel with each other, or the angle between the light beam B and the reference road surface becomes less than the gradient γap, which may cause a risk in which the light beam B does not impinge on the inclined surface Re, forming no mark. In the case where the emission angle θp is greater than the sum (γap+δpmax), on the other hand, the light beam B can impinge on the inclined surface Re of the gradient γap, forming a mark.

If the camera angle θc is less than or equal to the sum (γap+δpmax), and the vehicle body is inclined by the angle δpmax, the inclined surface Re with the descending gradient γap and the axis C become parallel to each other, or the angle between the axis C and the reference road surface becomes less than the gradient γap, which may cause a risk in which the axis C does not enter into a recessed portion of the road, making it impossible to take an image of the mark. In the case where the camera angle θc is greater than the sum (γap+δpmax), on the other hand, it is possible to reliably take an image of the mark even on the road surface Re with the descending gradient γap.

The emission angle θp and the camera angle θc are made different from each other (θp≠θc). This is because, in the case where these angles are equal to each other, the distance between the two mark images is fixed regardless of the value of the gradient γ of the road surface, making it impossible to obtain the gradient.

It is noted that the angle (γap+δpmax) corresponds to a first set angle, and the angle (90°−γap) corresponds to a second set angle.

As described above, elements such as the relative positional relationship between the emitting device and the imaging device, and the shape of the mark formed on the road surface by the emitted light beam may be designed as needed according to, e.g., a purpose of obtainment of the road surface state.

Embodiment 1

Figure 12:
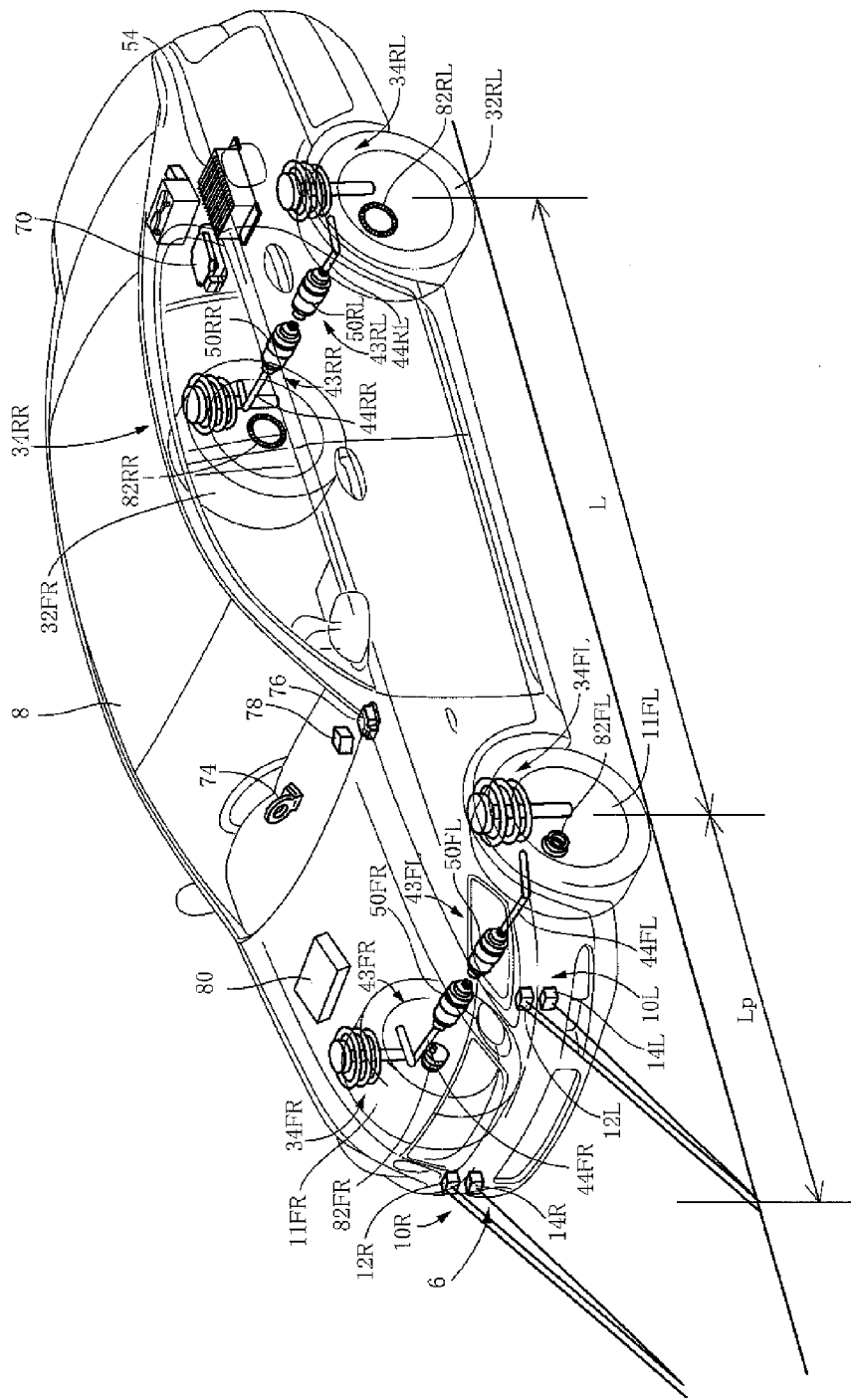
FIG. 12 is a view schematically illustrating an entire vehicle including a suspension system according to Embodiment 1 of the present invention, and this suspension system includes a road surface state obtaining device according to one embodiment of the present invention.

FIG. 12 illustrates one example of a suspension system including a road surface state obtaining device according to one embodiment of the present invention. As illustrated in FIG. 12, a road surface state obtaining device 6 includes two road surface image obtainers 10L, 10R provided on a front face of a vehicle body 8 so as to be spaced apart from each other in the widthwise direction of the vehicle. The road surface image obtainers 10L, 10R are respectively provided at positions corresponding respectively to a front left wheel 11FL and a front right wheel 11FR of the vehicle body 8.

Each of the road surface image obtainers 10L, 10R obtains an image of a road surface which includes a mark in front of the vehicle, specifically, in front of a corresponding one of the front left wheel 11FL and the front right wheel 11FR. The road surface image obtainers 10L, 10R respectively include (i) emitting devices 12L, 12R configured to respectively emit parallel light beams and (ii) cameras 14L, 14R each as an imaging device configured to take an image of an image pickup object on a predetermined region.

The emitting devices 12L, 12R and the cameras 14L, 14R are mounted on a front face (e.g., near a bumper) of the vehicle body 8 (hereinafter may be referred to as "over-spring member") at positions different from each other in the up and down direction. The parallel light beams emitted from the respective emitting devices 12L, 12R impinge on the road surface, forming two spot-like marks at positions different from each other in the front and rear direction. Each of the cameras 14L, 14R takes an image of the road surface on the predetermined region containing the two marks (i.e., the image pickup object).

In the present embodiment, the emitting devices 12L, 12R and the cameras 14L, 14R may have any relative positional relationship, but the emitting devices 12L, 12R and the cameras 14L, 14R are mounted in a state in which the emission angle $\theta p$ is greater than $(90°-\gamma ap)$, the camera angle $\theta c$ is less than the emission angle $\theta p$, and each of the emission angle $\theta p$ and the camera angle $\theta c$ is greater than the sum of the gradient $\gamma ap$ and the angle $\delta pmax$ ($\gamma ap+\delta pmax$).

The emitting devices 12L, 12R respectively emit parallel laser lights (hereinafter may be referred to as "laser light beam") such that two marks are formed on the road surface at positions spaced apart from each other in the front and rear direction.

Figure 14:
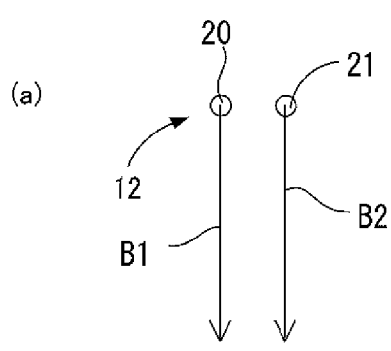
FIG. 14(a) is a view schematically illustrating the emitting device of the road surface state obtaining device.
FIG. 14(b) is a view schematically illustrating another emitting device of the road surface state obtaining device.
Figure 14:
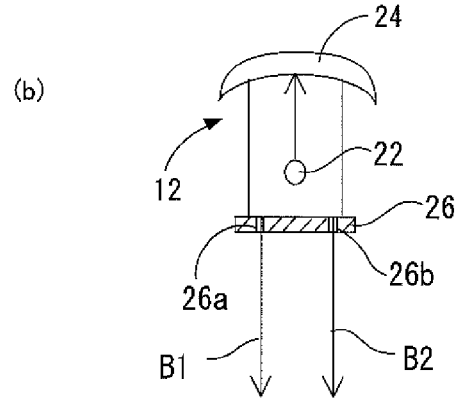

As illustrated in FIG. 14(a), the emitting devices 12L, 12R may respectively include two light sources 20, 21. Each of the light sources 20, 21 emits one laser light beam (hereinafter may be referred to as "laser beam"). The light sources 20, 21 are mounted spaced apart from each other in the up and down direction of the vehicle body 8 such that the laser light beams B1, B2 respectively emitted from the light sources 20, 21 are parallel with each other, and each of the laser light beams B1, B2 is emitted onto a reference road surface at the predetermined emission angle $\theta p$.

As illustrated in FIG. 14(b), each of the emitting devices 12L, 12R may include one light source 22, a reflective mirror 24, and a slit plate 26. The slit plate 26 have two slits 26a, 26b spaced apart from each other. Light emitted from the light source 22 and reflected from the reflective mirror 24 passes through the slits 26a, 26b to form the two laser light beams B1, B2 which are emitted to a front side of the vehicle.

Figure 15:
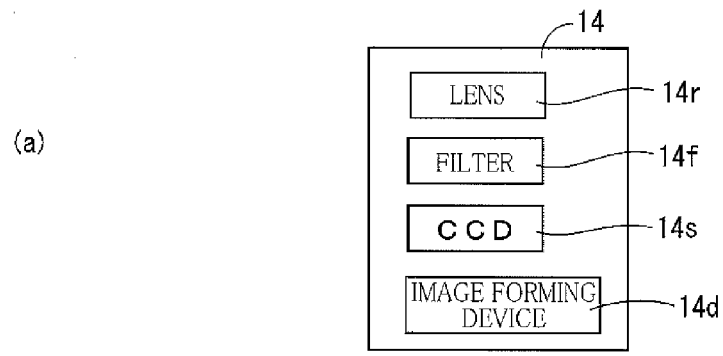
FIG. 15(a) is a view schematically illustrating a configuration of a camera of the road surface state obtaining device.
FIG. 15(b) is a view illustrating an image pickup region of the camera.
FIG. 15(c) is a view illustrating an image corresponding to an image pickup object which is determined by the image pickup region.
Figure 15:
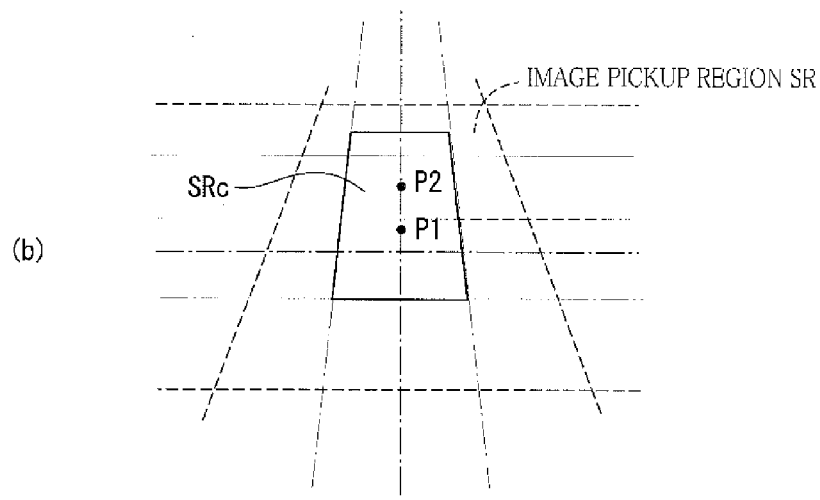
Figure 15:
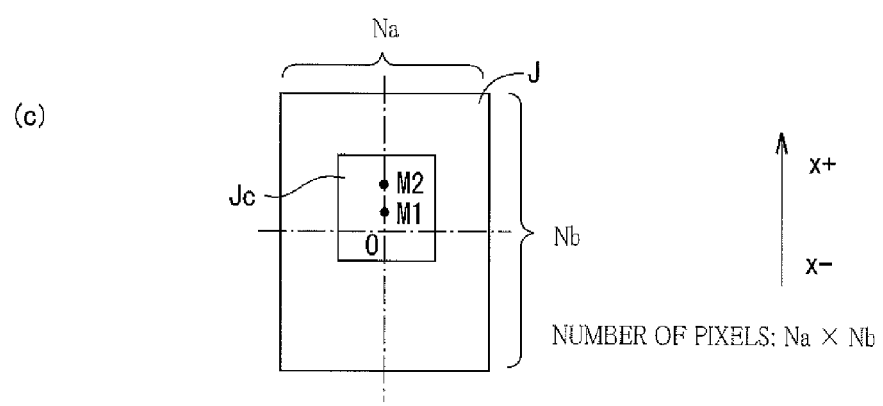

Each of the cameras 14L, 14R is a CCD (Charge Coupled Device) camera and as illustrated in FIG. 15(a) includes a lens 14r, a filter 14f, a CCD 14s as an imaging element, and an image forming device 14d. An image of the image pickup object such as a mark is formed on the CCD 14s via the lens 14r, and an optical image can be obtained. In each of the CCDs 14s, a light signal is converted into an electric signal which is then supplied to the image forming device 14d. In the following description, the CCD 14s may indicate each imaging element or the entirety of a plurality of imaging elements. The image forming device 14d executes processings based on electric signals output from the respective CCDs 14s belonging to a processing area (i.e., a cutout area) and forms an image corresponding to a portion of the image pickup object which is determined by the processing area. The filter 14f is a band-pass filter which allows passage of the laser light emitted at least from the emitting devices 12.

The cameras 14 are mounted in a state in which their respective lenses 14r face a front side of the vehicle. As illustrated in FIG. 15(b), each of the cameras 14 takes an image of the image pickup object (e.g., spots P1, P2, and the road surface) within an image pickup region SR surrounded by broken lines. As illustrated in FIG. 15(c), the picked-up image J corresponding to the image pickup region SR is constituted by (Na×Nb) pixels, but image processing is executed for only a portion of the picked-up image J, and this image processing produces a processed image Jc (which can be referred to as "cutout image Jc"). The processed image Jc contains spot images M1, M2 respectivley corresponding to the spots P1, P2. The processed image Jc corresponds to an image of an area SRc which is a portion of the image pickup region SR.

Figure 13:
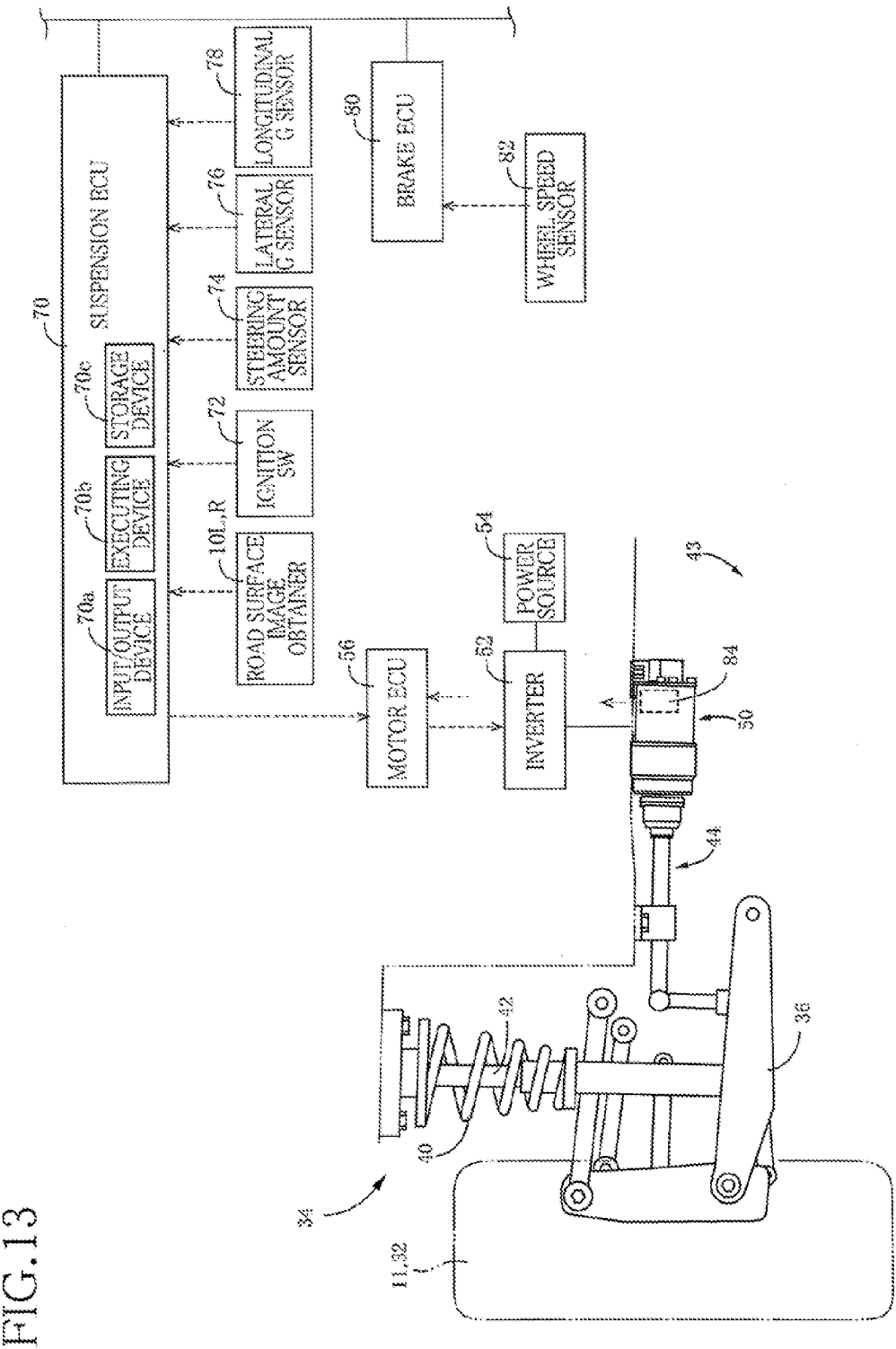
FIG. 13 is a view schematically illustrating a main portion of a suspension of the suspension system.

As illustrated in FIGS. 12 and 13, the vehicle is provided with the suspension system. The suspension system includes suspensions 34FL, FR, RL, RR provided respectively corresponding to front left and right wheels 11FL, FR and rear left and right wheels 32RL, RR.

The suspensions 34FL, FR, RL, RR respectively include a plurality of suspension arms 36FL, FR, RL, RR, springs 40FL, FR, RL, RR, shock absorbers 42FL, FR, RL, RR, and vertical-force generating devices 43FL, FR, RL, RR.

In the following description, suffixes FL, FR, RL, and RR respectively indicating wheel positions, and suffixes R and L respectively indicating right and left sides may be used in the case where information about the wheel positions is required for the suspensions and other similar devices, and no suffixes may be used in the case where the information about the wheel positions is not required.

Also, the under-spring member indicates the wheels, the suspension arms, and other similar components, and the over-spring member indicates the vehicle body and other similar components.

The plurality of suspension arms 36 (hereinafter may indicate a plurality of suspension arms collectively and may indicate one of the plurality of suspension arms) hold the respective wheels 11, 32 on the vehicle body 8. Springs 40 and shock absorbers 42 are provided in parallel between the over-spring member 8 and the suspension arms (i.e., lower arms) 36, namely, the under-spring member 36.

Each of vertical-force generating devices 43 includes an L-shaped bar 44 and a rotary electric actuator 50. As illustrated in FIG. 13, the L-shaped bar 44 includes a shaft portion and an arm portion. One end portion of the arm portion is swingably connected to a corresponding one of the suspension arms 36 (i.e., a lower arm), and the other end portion of the shaft portion is held by the vehicle body 8 via a corresponding one of the rotary electric actuators 50 such that the shaft portion is rotatable about an axis. Each of the rotary electric actuators 50 includes an electric motor and a speed reducer and controls a twist force acting on the shaft portion of the L-shaped bar 44 to control a vertical force Fact which is applied to both of the under-spring member 36 and the over-spring member 8 via the arm portion.

A spring force generated by the springs 40, a damping force generated by the shock absorbers 42, and the vertical force Fact generated by the vertical-force generating devices 43 are applied between the under-spring member 36 and the over-spring member 8. In a steady state of the vehicle, a force acting between the under-spring member 36 and the over-spring member 8 (e.g., a load) is balanced with the spring force, the damping force, and the vertical force Fact. A position of each rotary electric actuator 50 in this case is defined as a reference position, and the applied vertical force Fact is defined as a reference value. The vertical force Fact is controlled by controlling a direction and an angle of rotation of the rotary electric actuator 50 from the reference position.

The present suspension system is provided with a suspension ECU 70 mainly constituted by a computer. The suspension ECU 70 includes an input/output device 70a, an executing device 70b, and a storage device 70c. Devices connected to the input/output device 70a include the road surface image obtainers 10L, 10R, an ignition switch 72, a steering amount sensor 74 for detecting an steering angle of a steering wheel, a lateral G sensor 76 for detecting lateral acceleration acting on the vehicle, a longitudinal G sensor 78 for detecting longitudinal acceleration, and motor ECUs 56 provided for the respective wheels. A brake ECU 80 is connected to the suspension ECU 70 via a CAN, and information about a running speed v of the vehicle which is obtained based on detection values of wheel speed sensors 82 provided on the respective wheels is supplied to the brake ECU. The storage device 70c of the suspension ECU 70 stores tables illustrated in FIGS. 3(a) and 3(b), a plurality of programs, and so on.

<Suspension Control>

[FF Skyhook Control]

Figure 16:
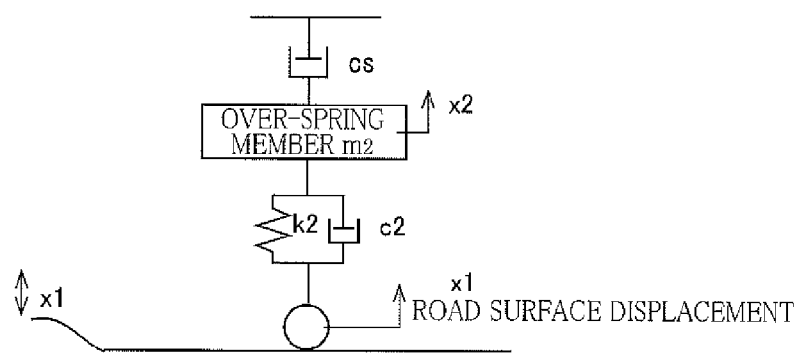
FIG. 16 is a model of the suspension of the suspension system.

A single-degree-of-freedom model illustrated in FIG. 16 will be considered.

The mass of the over-spring member 8 is defined as m2, a displacement thereof is defined as x2, the spring constant of the spring 40 provided between the over-spring member and the under-spring member is defined as k2, the damping coefficient of the shock absorber 42 is defined as c2, and a road input is defined as x1. In a road surface displacement in low frequency, an under-spring displacement sufficiently follows a road surface displacement, and no consideration is provided for this under-spring displacement. Also, the damping coefficient of a skyhook damper is defined as cs.

In this model, the following equation of motion is established:

$$m2 \cdot x2''(t) + (c2 \cdot cs) x2'(t) + k2 \cdot x2(t) = c2 \cdot x1(t)' + k2 \cdot x1(t)$$

In this equation, the single quotations represent a first derivative, and the double quotation represents a second derivative.

Here, the skyhook control is divided into FB skyhook control based on vibrations of the over-spring member 8 and FF skyhook control based on a road input. To suppress vibrations of the over-spring member 8 due to the road input, the FF skyhook control is executed such that a skyhook force $\{cs \cdot x2''(t)\}$ is made equal to a force Fin (hereinafter may be referred to as "under-spring force") acting on the over-spring member due to a road surface displacement x1.

$$Fin = c2 \cdot x1(t)' + k2 \cdot x1(t)$$

$$cs \cdot x2''(t) = Fin \qquad (1)$$

Each time when a set time period is (i.e., a cycle time of 8 msec, for example) is elapsed, in the present embodiment, each of the road surface image obtainers 10L, 10R takes an image of the image pickup object on the image pickup region SR and executes processings for an area corresponding to a predetermined processing area SRc to obtain a processed image Jc. The obtained processed image Jc (i.e., image data representative of the processed image Jc) is supplied to the suspension ECU 70.

For example, the suspension ECU 70 obtains a longitudinal distance e between two mark images M1, M2 on a processed image Jc illustrated in FIG. 15(c) and further obtains an amount Δe of change in the distance. The gradient γ of the road surface in the front and rear direction, and the amount Δγ of change in the gradient are obtained based on the distance e, the amount Δe of change, and the relationship illustrated in FIGS. 3(a) and 3(b).

An amount of change in the height position of the road surface, i.e., a road surface displacement xh, within the set time period ts in the case where the vehicle is running at a vehicle speed v (m/sec) is expressed by the following equation:

$$xh = \tan \gamma \cdot v \cdot ts \qquad (2)$$

An amount of change in the road surface displacement xh, i.e., a road-surface change speed Δxh, within the set time period ts can be approximated by the following equation:

$$\Delta xh = \tan(\Delta \gamma) \cdot v \cdot ts \qquad (3)$$

The road surface displacement xh within the set time period ts and the amount Δxh of change in the road surface displacement xh within a set time period can be respectively used as x1(t), x1(t)' in Equation (1), and the under-spring force Fin is obtained as in the following equation:

$$Fin = \{c2 \cdot \Delta xh + k2 \cdot xh\} \qquad (4)$$

In the present embodiment, the FF skyhook control is applied to a control of the vertical-force generating devices 43. The vertical-force generating devices 43 are controlled so as to reduce the under-spring force Fin, and an amount of control of the vertical force Fact can be determined, for example, as in the following equation:

$$\Delta Fact = -\{c2 \cdot \Delta xh + k2 \cdot xh\}$$

A target rotation angle and a rotational direction of each rotary electric actuator 50 are determined based on a control amount ΔFact, and the target rotation angle and the rotational direction are produced as control command values and output to the motor ECU 56.

An actual rotation angle of the rotary electric actuator 50 is detected by a rotation angle sensor 84, and the motor ECU 56 controls an inverter 52 such that the actual rotation angle reaches the target rotation angle.

In Equation (1), a value x0(t) obtained by integrating the road surface displacement xh within the set time period is with respect to a unit time may be employed as the road surface displacement x1(t), and a value obtained by differentiating the value x0(t) may be employed as a road-surface change speed x0(t)'.

$$x0(t) = \int xh \, dt$$

$$x0(t)' = d\{x0(t)\}/dt$$

[Preview Control]

A road surface (i.e., the inclination-state obtainment object Rp) whose inclination state is to be obtained by the road surface state obtaining device 6 is located in front of the front wheels 11FL, FR by the preview distance Lp. A time Tf (=Lp/v) obtained by dividing the preview distance Lp by the vehicle speed v is a previewable time in the case where the vertical-force generating devices 43FL, FR for the respective front wheels 11FL, FR are controlled. Likewise, a time Tr {=(Lp+L)/v} obtained by dividing, by the vehicle speed v, a value (Lp+L) obtained by adding a wheelbase L to the preview distance Lp is a previewable time in the case where the vertical-force generating devices 43RL, RR for the respective rear wheels 32RL, RR are controlled. Each of the previewable times Tf, Tr is a length of time extending from an image-pickup of the inclination-state obtainment object Rp to a passage of a corresponding one of the front wheels 11 and the rear wheels 32 through the inclination-state obtainment object Rp.

Since each rotary electric actuator 50 suffers a long actuation delay, the control command values needs to be output a preview compensation time τ (i.e., a time of the actuation delay) before the passage of the control target wheel through the inclination-state obtainment object Rp.

In the above-described controls, when a time (Tf–τ) has passed from the image-pickup of the inclination-state obtainment object Rp, the control command values for the suspensions 34 provided for the respective front wheels 11 are output, and when the time (Tr–τ) has passed, the control command values for the suspensions 34 provided for the respective rear wheels 32 are output. This control allows the rotary electric actuators 50 to be actuated based on the road input in accordance with the passages of the front wheels 11 and the rear wheels 32 through the inclination-state obtainment object Rp.

It is noted that the preview control can be executed such that when the control command values are output, the control command values are produced based on information about the respective gradients γ established the time (Tf–τ) and the time (Tr–τ) before, respectively.

[Control Based on Inertial Force]

The control based on the inertial force is constituted by combination of a roll suppression control based on a lateral G and a pitch suppression control based on a longitudinal G. The control based on the inertial force is not the preview control but a normal control.

The roll suppression control is a control for suppressing a lateral inclination of the vehicle body which is caused by a roll moment acting on the vehicle. A control lateral G (Gys) is determined according to the following equation based on (i) an estimated lateral G (Gya) determined based on a steering angle φ of the steering wheel and the vehicle speed v and (ii) an actual lateral G (Gyb) which is a detection value of the lateral G sensor 76:

$$Gys = Ka \cdot Gya + Kb \cdot Gyb$$

A target rotation angle (i.e., a roll-suppression target rotation angle) θrref of the rotary electric actuator 50 is determined based on the control lateral Gys. Each of the signs Ka, Kb is a gain and a predetermined value.

A relationship between the control lateral Gys and the roll-suppression target rotation angle θrref is tabulated in advance and stored.

The pitch suppression control is a control for suppressing a front and rear inclination of the vehicle body which is caused by a pitching moment acting on the vehicle. The pitch-suppression target rotation angle θpref is determined according to the following equation using an actual longitudinal G (Gxb) detected by the longitudinal G sensor 78:

$$\theta pref = Kc \cdot Gxb$$

Figure 17:
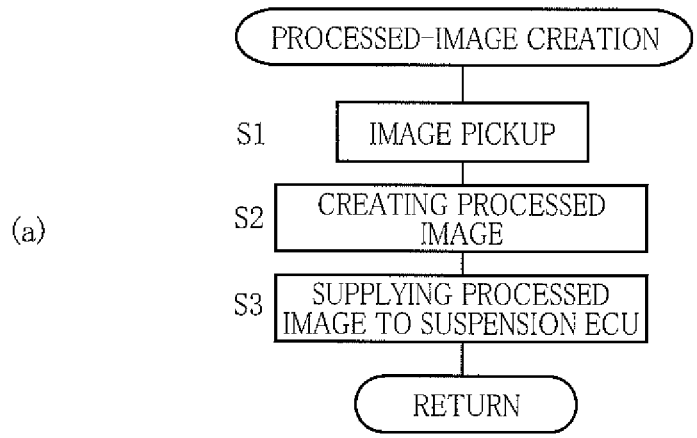
FIG. 17(a) is a flow chart illustrating a processed-image creating program stored in a storage device of an image forming device of the camera.
FIG. 17(b) is a flow chart illustrating a road-surface-gradient obtaining program stored in a storage device of the suspension ECU.
Figure 17:
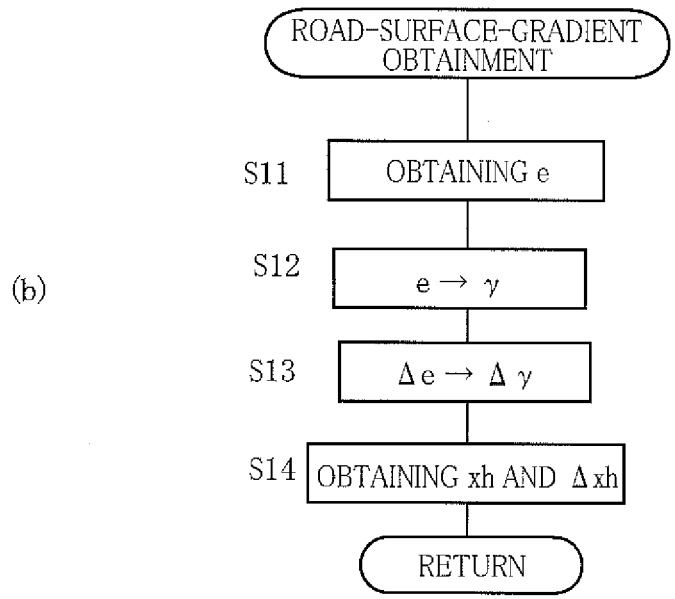

FIG. 17(*a*) is a flow chart illustrating a processed-image creating program which is executed each time when a set time period determined in advance by the image forming device 14*d* of the camera 14 is elapsed.

When the laser lights are emitted from the respective emitting devices 12, this flow begins with Step 1 (hereinafter abbreviated as S1",") and this applies to the other Steps) at which each of the cameras 14 takes an image of an image pickup object containing two marks formed on the road surface. Image processing is executed at S2 for a predetermined cutout area to create a processed image Jc, and the created processed image Jc is at S3 supplied to the suspension ECU 70.

FIG. 17(*b*) is a flow chart illustrating a road-surface-gradient obtaining program which is executed each time when a set time determined in advance by the suspension ECU 70 is elapsed.

At S11, the longitudinal distance e between two mark images M1, M2 on the obtained processed image dc is obtained. At S12, the gradient γ of the road surface (i.e., an inclination angle) and the direction of the inclination are obtained based on the distance e and the gradient determination table illustrated in FIG. 3(*a*). At S13, the amount Δγ of change in the gradient γ is obtained based on the amount Δe of change in the distance e, the direction of the inclination, and the gradient-change determination table illustrated in FIG. 3(*b*). At S14, the road surface displacement xh and the road-surface change speed Δxh are obtained according to Equations (2) and (3).

Figure 18:
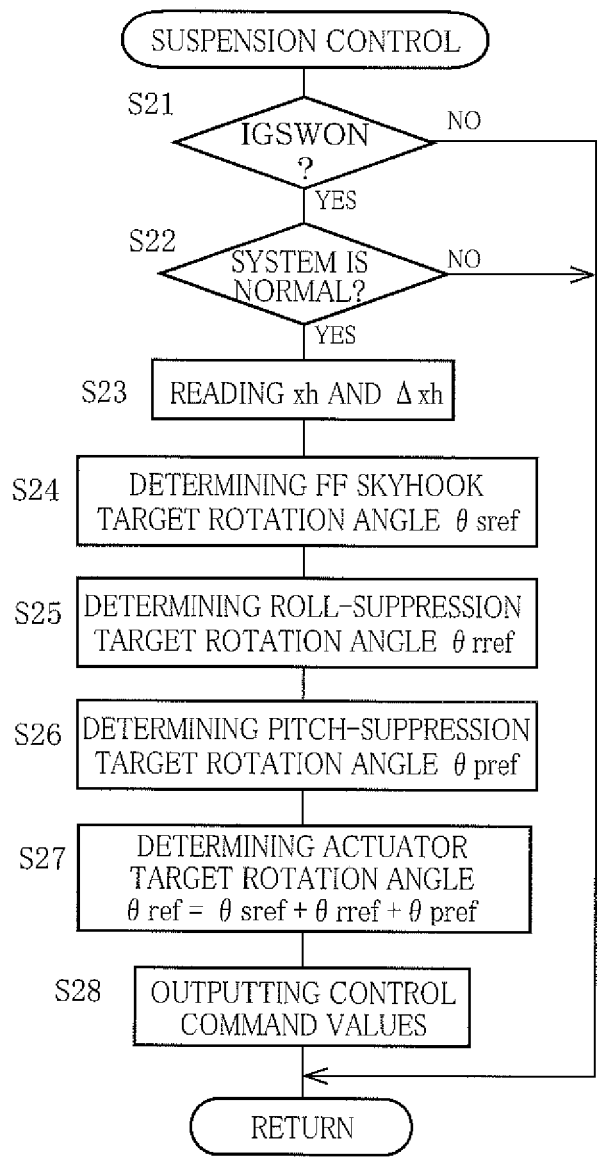
FIG. 18 is a flow chart illustrating a suspension control program stored in the storage device of the suspension ECU of the suspension system.

FIG. 18 is a flow chart illustrating a suspension control program which is executed each time when a set time period is elapsed.

At S21, it is determined whether the ignition switch 72 is ON or not. At S22, it is determined whether the system is normal or not. When the ignition switch 72 is ON, and the system is normal, the road surface displacement xh and the road-surface change speed Δxh are at S23 read which are obtained a time (Tf–τ) earlier in the case where the control target wheel is the front wheels 11FL, FR, and this time (Tf–τ) is a time obtained by subtracting the preview compensation time ti from the previewable time Tf. The control amount ΔFact of the vertical force Fact in the FF skyhook control is obtained at S24, and a target rotation angle θref and a rotational direction of the rotary electric actuators 50 are obtained.

At S25, the actual lateral G (Gyb), the steering angle φ, and the vehicle speed v at this point in time are detected to obtain the roll-suppression target rotation angle θrref and the rotational direction based on these detected parameters. At S26, the actual longitudinal G (Gxb) at this point in time is detected to determine the pitch-suppression target rotation angle θpref and the rotational direction.

At S27, the sum of these target rotation angles is obtained and set as a target rotation angle θref of the rotary electric actuators 50.

$$\theta ref = \theta sref + \theta rref + \theta pref$$

The control command values are output to the motor ECUs 56FL, FR for the respective front wheels.

The actual rotation angle of the rotary electric actuators 50 is thereafter detected by the rotation angle sensor 84 and is brought closer to the target rotation angle θref, and the control for the rotary electric actuators 50 is executed by the control for the inverter 52 by the motor ECUs 56.

In the case where the control target wheel is the rear wheels 32RL, RR, at S24, the road surface displacement xh and the road-surface change speed Δxh are read which are obtained the time (Tr–τ) earlier, and this time (Tr–τ) is obtained by subtracting the preview compensation time τ from the previewable time Tr. The target rotation angle θref of the rotary electric actuators 50 is determined, and the control command values are output to the motor ECUs 56RL, RR of the respective rear wheels 32.

In the present embodiment as described above, the preview control is executed using the gradient of the road surface which is obtained by the road surface state obtaining device 6, which can reduce a control delay due to the actuation delay of the rotary electric actuators 50, suppressing the vibrations of the over-spring member due to the road input.

Also, the gradient of the road surface is obtained without using a detection value of an over-spring vertical acceleration sensor, a detection value of a vehicle height sensor, and other similar detection values. This configuration can omit sensors such as the over-spring vertical acceleration sensor and the vehicle height sensor, and this configuration can reduce an amount of increase in cost.

Furthermore, both of the control of the inertial force and the FF skyhook control are executed, which can reliably suppress the vibrations of the over-spring member 8.

It is noted that the control related to the inertial force does not always need to be executed in the suspension control.

The vertical-force generating devices 43 are not essential, and the damping force of the shock absorbers 42 may be controlled based on the gradient of the road surface which is obtained by the road surface state obtaining device 6. Since the actuator delay is small in this case, the preview compensation time can be set at a small value or zero. Also, both of the control of the shock absorbers 42 and the control of the vertical-force generating devices 43 may also be executed together.

While the two parallel light beams are emitted to form the spot-shaped marks on the road surface, three or more parallel light beams may be emitted.

In the present embodiment, a suspension control device is constituted by devices including the suspension ECU 70, the motor ECUs 56, the rotary electric actuators 50, the L-shaped bars 44, the inverter 52, the steering amount sensor 74, the lateral G sensor 76, and the longitudinal G sensor 78. The road surface state obtaining device 6 is constituted by, e.g., portions of the suspension ECU 70 which store and execute the road-surface-gradient obtaining program, and the road surface image obtainers 10L, 10R.

Figure 3:
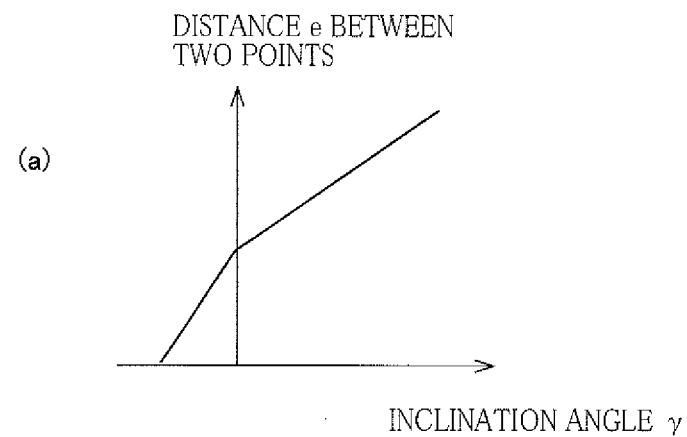
Figure 3:
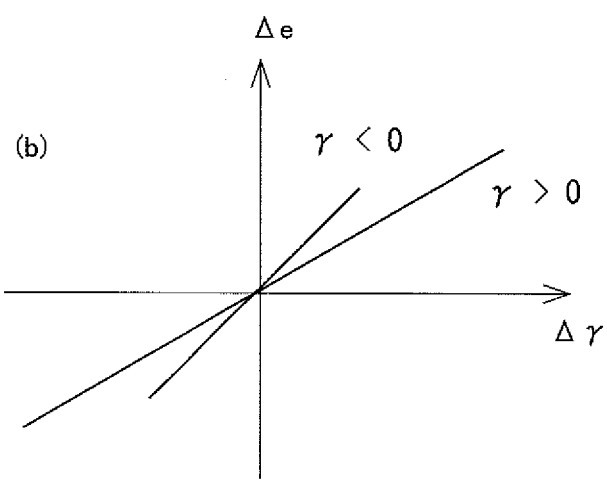

A longitudinal distance obtainer is constituted by portions of the road surface state obtaining device 6 which store and execute the processing at S11 in the road-surface-gradient obtaining program, and a gradient obtainer is constituted by, e.g., portions of the road surface state obtaining device 6 which store and execute the processing at S12 and the gradient determination table illustrated in FIG. 3(*a*). The gradient obtainer also serves as a first gradient obtainer and a first inclination obtainer. A portion of the suspension ECU 70 which stores the gradient determination table illustrated in FIG. 3(*a*) constitutes a gradient-determination-table storage device. The gradient-determination-table storage device also serves as a first gradient-determination-table storage device.

A preview controller is constituted by, e.g., portions of the suspension ECU 70 which store and execute the processings at S23 and S24 in the suspension control program. A vertical-vibration suppressing controller (an under-spring force reducer) is constituted by, e.g., portions of the suspension ECU 70 which store and execute the processing at S24 in the suspension control program.

Embodiment 2

In Embodiment 1, the gradient γ of the road surface in the front and rear direction in front of the front left and right wheels 11FL, FR is obtained. In the present embodiment, the gradient α of the road surface in the right and left direction in front of the front left and right wheels 11FL, FR is obtained.

Figure 19:
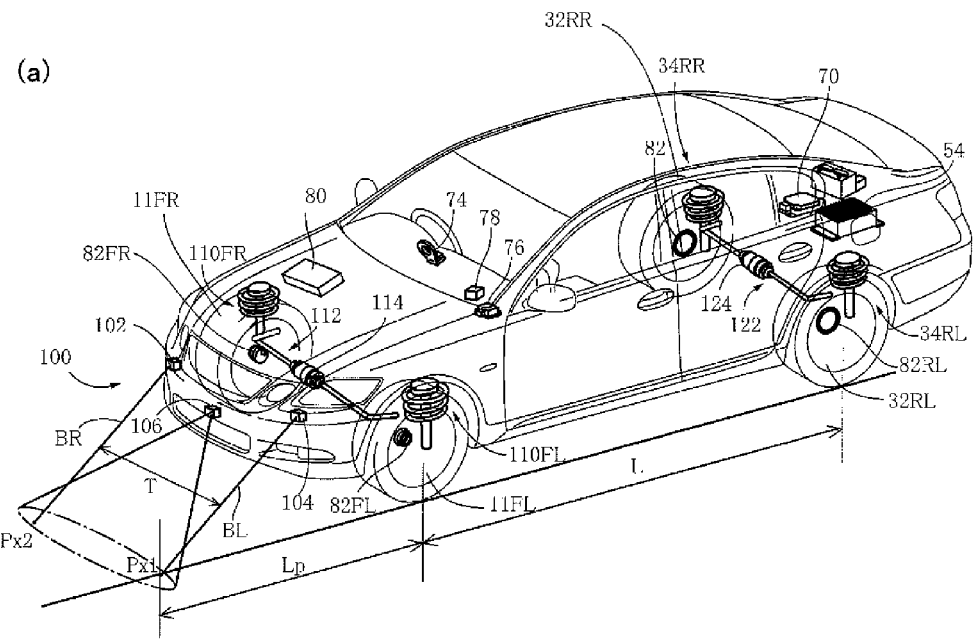
FIG. 19(a) is a view schematically illustrating an entire vehicle including a suspension system according to Embodiment 2 of the present invention.
FIG. 19(b) is a view illustrating a processed image created by an imaging device of a road surface state obtaining device of the suspension system.
FIG. 19(c) is a map representing a relationship (i.e., a gradient determination table) between a longitudinal distance ex and a gradient α in the right and left direction.
Figure 19:
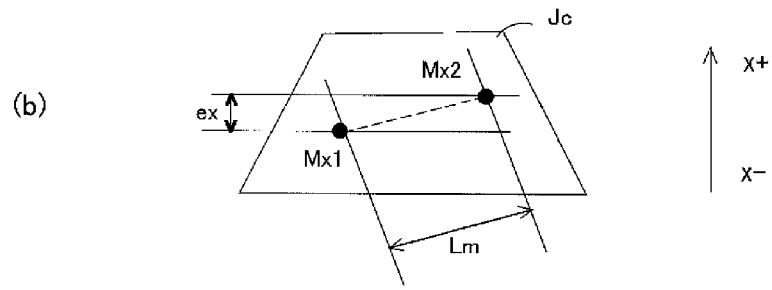
Figure 19:
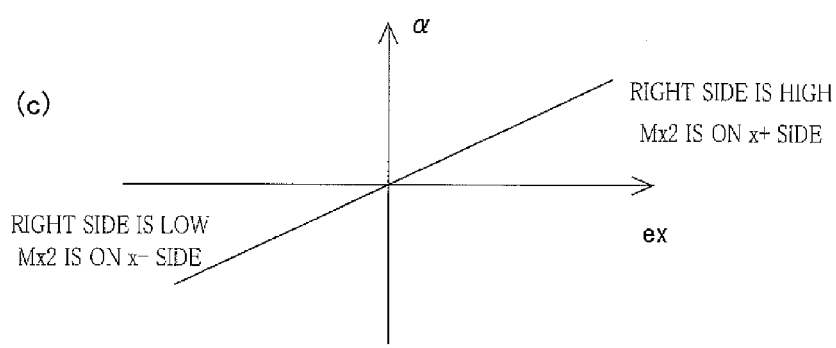

As illustrated in FIG. 19(*a*), a road surface image obtainer 100 includes: light sources 102, 104, each as an emitting device, provided on the front face of the vehicle at positions respectively corresponding to the front left wheel 11FL and the front right wheel 11FR so as to be spaced apart from each other in the right and left direction; and a wide-angle camera 106 provided at a central portion of the front face. The light sources 102, 104 emit laser light beams BL, BR, respectively. The wide-angle camera 106 takes an image of an image pickup object on a predetermined region containing marks Px1, Px2 formed on the road surface by the respective laser light beams BL, BR. The wide-angle camera 106 is mounted below the light sources 102, 104 (θp>θc).

As illustrated in FIG. 19(*b*), a longitudinal distance ex between two mark images Mx1, Mx2 corresponding to the respective two marks Px1, Px2 on the processed image Jc is obtained. The larger gradient α of the road surface in the right and left direction is obtained in the case where the longitudinal distance ex between the two mark images Mx1, Mx2 is long than in the case where the longitudinal distance ex between the two mark images Mx1, Mx2 is short. A location Px2 corresponding to the mark image Mx2 located on an x+ side of the picked-up image J is higher than a location Px1 corresponding to the mark image Mx1. Accordingly, it is obtained that the road surface inclines in the right and left direction in a direction in which the height increases from the left side to the right side.

In the present embodiment, the distance ex is represented as a positive value in the case where the mark image Mx2 is located on an x+ side of the mark image Mx1, and the distance ex is represented as a negative value in the case where the mark image Mx2 is located on an x− side of the mark image Mx1. Also, the inclination angle θ in the direction in which the height increases from the left side to the right side is represented as a positive value (α>0), and the inclination angle α in the direction in which the height decreases from the left side to the right side is represented as a negative value (α<0). A relationship (i.e., a gradient determination table), illustrated in FIG. 19(*c*), between the distance ex and the inclination angle α in the right and left direction is obtained in advance and stored in the storage device 70c of the suspension ECU 70.

A right and left distance between portions on the road surface on which the respective marks Px1, Px2 are formed is equal to a tread T. Accordingly, a height difference xLR (=xL−xR) between the portions on the road surface on which the respective marks Px1, Px2 are formed (which difference can be referred to as "right and left difference in height of the road surface"), i.e., the difference xLR between the height of portions of the road surface through which the respective left wheels 11FL, 32RL pass and the height of portions of the road surface through which the respective right wheels 11FR, 32RR pass is expressed in the following equation:

$$xLR = T \cdot \tan \alpha \tag{5}$$

It is noted that a length Lm between the mark images Mx1, Mx2 can be obtained to obtain the gradient α of the road surface in the right and left direction.

In the present embodiment, suspensions 110FL, FR for the respective front left and right wheels 11FL, FR share a stabilizer bar 112 and a rotary electric actuator 114, and suspensions 120RL, RR for the respective rear left and right wheels 32RL, RR share a stabilizer bar 122 and a rotary electric actuator 124. One end portion of each of the stabilizer bars 112, 122 is swingably connected to a corresponding one of the suspension arms (the lower suspension arms) 36FL, RL provided for the respective left wheels 11FL, 32RL, and the other end portion of each of the stabilizer bars 112, 122 is swingably connected to a corresponding one of the suspension arms (the lower suspension arms) 36FR, RR provided for the respective right wheels 11FR, 32RR. Each of the stabilizer bars 112, 122 is held at its intermediate portion by the vehicle body 8 so as to be rotatable about an axis. Each of the stabilizer bars 112, 122 is divided into two portions at its intermediate portion at which a corresponding one of rotary electric actuators 114, 124 is provided. Each of the rotary electric actuators 114, 124 can control a relative phase of an other-side portion of each of the stabilizer bars 112, 122 with respect to its one-side portion.

While a twist resistance force of each stabilizer bar is determined according to a force which can be output from a corresponding one of the rotary electric actuators 114, 124, a change in the relative phase between the one-side portion and the other-side portion also changes the twist resistance force. Thus, in the present embodiment, the control of the relative rotation angle of the rotary electric actuators 114, 124 controls a roll suppressing force of each of the stabilizer bars 112, 122, and the target rotation angle of the rotary electric actuators 114, 124 is obtained such that the roll suppressing force has a magnitude which can suppress a roll moment estimated to be generated due to the road input.

A roll moment Mr estimated to be generated due to the road input is obtained based on the left-right difference xLR in height of the road surface as in the following equation (K is a constant):

$$Mr = K \cdot xLR \qquad (6)$$

Since the left-right difference xLR in height of the road surface corresponds to the inclination angle α, the estimated roll moment Mr can also be obtained as in the following equation (K' is a constant):

$$Mr = K' \cdot \alpha$$

Figure 20:
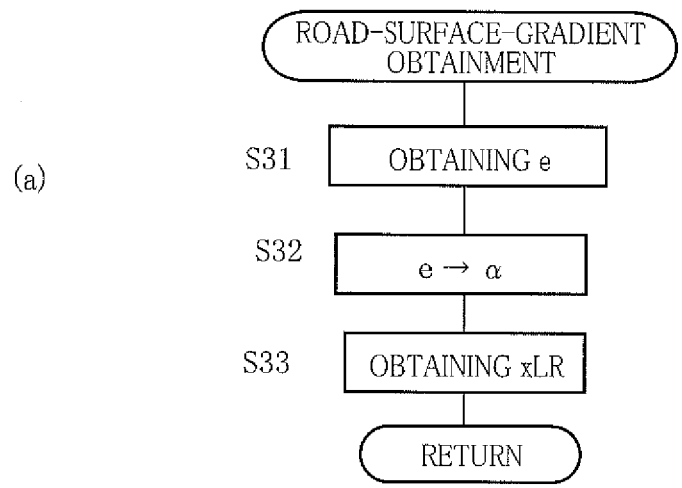
FIG. 20(a) is a flow chart illustrating a road-surface-gradient obtaining program stored in a storage device of a suspension ECU of the suspension system.
FIG. 20(b) is a flow chart illustrating a suspension control program.
Figure 20:
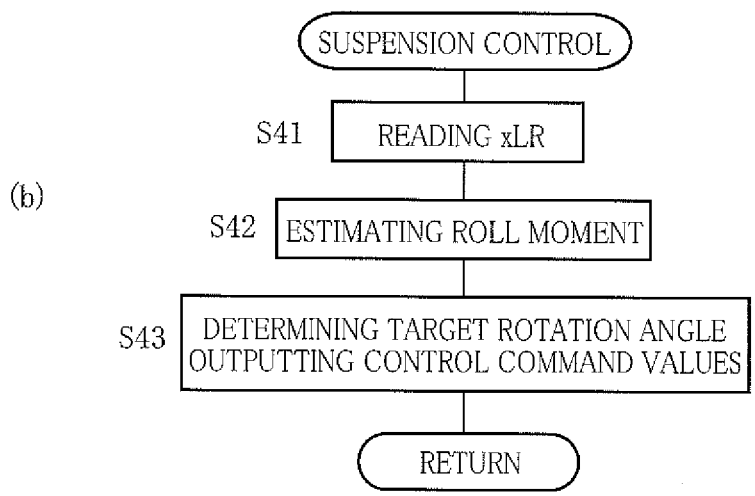

FIG. 20(*a*) is a flow chart illustrating a road-surface-gradient obtaining program which is executed each time when a set time period is elapsed.

At S31, the longitudinal distance ex between the mark images Mx1, Mx2 is obtained. At S32, the inclination angle α is obtained based on the distance ex and a gradient determination table illustrated in FIG. 19(*c*) and stored in advance. At S33, the left-right difference xLR in height of the road surface is obtained according to Equation (5).

FIG. 20(*b*) is a flow chart illustrating a suspension control program which is executed each time when a set time period is elapsed.

In the case where the rotary electric actuator 114 for the front wheels is controlled, the left-right difference xLR in height of the road surface is at S41 obtained which is obtained based on the processed image Jc at a time point the time (Tf−τ) (i.e., the time obtained by subtracting the preview compensation time from the previewable time) earlier. At S42, the roll moment Mr estimated to be generated is obtained according to Equation (6). At S43, the target rotation angle θref is determined so as to obtain a roll suppressing force which can suppress the roll moment Mr, and the control command values are output.

The motor ECU 56 controls the rotary electric actuator 114 such that the actual rotation angle is brought closer to the target rotation angle.

In the case where the rotary electric actuator 124 for the rear wheels is controlled, the left-right difference xLR is at S41 read which is obtained based on the processed image Jc at a time point the time (Tr−τ) earlier. At S42, the roll moment estimated to be generated is obtained. At S43, the control command values are similarly produced and output.

It is noted that the target rotation angle θref can be determined at a value obtained by multiplying the inclination angle α by a coefficient.

In the present embodiment as described above, the roll suppressing force of each of the stabilizer bars 112, 122 is controlled, in accordance with the passage through the road surface, to be determined at a value which can suppress the roll moment estimated to be generated due to the right and left difference in height of the road surface.

In the present embodiment, a roll suppressing controller is constituted by portions of the suspension ECU 70 which store and execute the processings at S42, 43 in the suspension control program.

Also, an area including the portions on the road surface on which the respective marks Px1, Px2 are formed (i.e., a left road surface portion and a right road surface portion) is the inclination-state obtainment object Rp.

It is noted that the roll moment estimated to be generated due to the road input can be obtained based on both of the left-right difference xLR in height of the road surface and an amount ΔxLR of change in the left-right difference xLR (which can be referred to as "the amount of change in the left-right difference in height") within the set time period ts. The amount of change in the left-right difference in height can be approximated as in the following equation:

$$\Delta xLR = T \cdot \tan \Delta \alpha$$

The roll moment Mr can be obtained as in the following equation (each of ka and kb is a constant):

$$Mr = ka \cdot xLR + kb \cdot \Delta xLR$$

Embodiment 3

Figure 21:
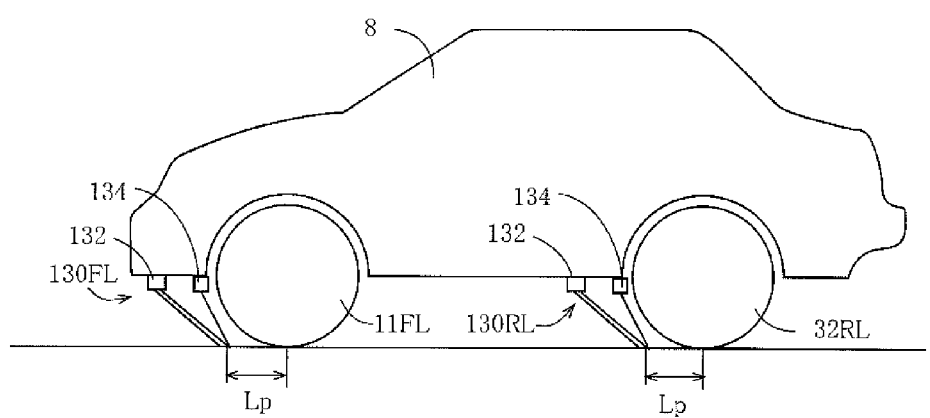
FIG. 21 is a view schematically illustrating an entire vehicle including a suspension system according to Embodiment 3 of the present invention.

While the road surface image obtainers 10L, 10R are mounted on the front face of the vehicle body 8 in Embodiment 1, road surface image obtainers 130FL, FR, RL, RR may, as illustrated in FIG. 21, be provided on a lower side of the vehicle body 8 at positions respectively in front of the front left and right wheels 11FL, FR and the rear left and right wheels 32RL, RR.

In the present embodiment, each of emitting devices 132 is mounted in a rearward inclining attitude, and cameras 134 each as an imaging device are mounted at a rear of the respective emitting devices 132. Each of the emitting devices 132 and a corresponding one of the cameras 134 are mounted spaced apart from each other in the longitudinal direction of the vehicle body 8, so that the emission angle θp and the camera angle θc differ from each other. In the present embodiment, the preview distance Lp for the front wheels 11 and the preview distance Lp for the rear wheels 32 are equal to each other.

Since the road surface image obtainers 130 are provided on the lower side of the vehicle body 8, the preview distance Lp is short. However, the mark image in the picked-up image does not move to a position greatly far from the reference position O even when the gradient γ of the road surface changes, which can narrow the processing area. This configuration can reduce a time required for calculation.

Since the road surface image obtainers 130 are mounted on the lower side of the vehicle body 8, dirt, water, and the like do not easily adhere to the emitting devices 132 and lens of the respective imaging devices 134. In addition, this construction reduces a possibility that small stones hit the emitting devices 132 and the lens of the respective imaging devices 134. As a result, the emitting devices 132 and the lens of the respective imaging devices 134 need to be cleaned with a less frequency, and the necessity of providing components or devices for preventing soil is reduced. Furthermore, this construction is not affected by sunlight so much, whereby an image of the mark can be taken satisfactorily.

The laser light beams are emitted from the emitting devices 132 to form marks each having the shape of a cross or the L-shape as illustrated in FIG. 11(c). This configuration makes it possible to obtain both of the gradient γ of the road surface in the front and rear direction and the gradient α in the right and left direction respectively in front of the left and right front wheels 11 and the left and right rear wheels.

{Road-Input-Dependent Roll Suppression Control}

An average value αF of gradients αFL, αFR in the right and left direction which are respectively obtained for the inclination-state obtainment objects Rp located in front of the respective front left and right wheels 11FL, FR is obtained as in the following equation:

$$\alpha F=(\alpha FL+\alpha FR)/2$$

A left-right height difference xLR between a portion of the road surface through which the front left wheel 11FL passes and a portion of the road surface through which the front right wheel 11FR passes is obtained using the average value αF.

$$xLR=T\cdot\tan\alpha F$$

A roll moment Mr estimated to be generated due to the road input is obtained as in the following equation:

$$Mr=K\cdot xLR$$

A road-surface-input-dependent roll-suppression target rotation angle θrref and a rotational direction of each of the rotary electric actuators 50FL, FR for the respective vertical-force generating devices 43FL, FR provided for the respective front left and right wheels 11FL, FR are determined so as to suppress the roll moment Mr. In this case, the two rotary electric actuators 50FL, FR output a torque which can suppress the roll moment Mr.

Similar processings are executed for the rear left and right wheels 32RL, RR. The average value αR of obtained gradients αRL, αRR in the right and left direction is obtained as in the following equation:

$$\alpha R=(\alpha RL+\alpha RR)/2$$

A height difference (left-right difference) xLR between a portion of the road surface through which the rear left wheels 32RL passes and a portion of the road surface through which the rear right wheel 32RR passes is obtained.

$$xLR=T\cdot\tan\alpha R$$

A road-surface-input-dependent roll-suppression target rotation angle θrref, and a rotational direction of each of the rotary electric actuators 50RL, RR for the respective vertical-force generating devices 43RL, RR provided for the respective rear left and right wheels 32RL, RR are determined so as to suppress the roll moment estimated to be generated due to the road input.

{Road-Input-Dependent Pitch Suppression Control}

An average value γF of gradients γFL, γFR in the front and rear direction which are obtained for the inclination-state obtainment objects Rp located in front of the respective front left and right wheels 11FL, FR is obtained as in the following equation:

$$\gamma F=(\gamma FL+\gamma FR)/2$$

An average value xhf of displacements (i.e., road surface displacements) in height between the portions of the road surface through which the respective front left and right wheels 11FL, FR pass is obtained using the average value γF.

$$xhf=\tan\gamma F\cdot v\cdot ts$$

A road surface height xf is obtained by obtaining a cumulative value of the average value xhf of the road surface displacements (e.g., an integral from a point in time when the vehicle is running on the reference road surface).

$$xf=\Sigma(\tan\gamma F\cdot v\cdot ts)$$

Similar processings are executed for the rear wheels. An average value xhr of displacements in height between portions of the road surface through which the rear left and right wheels 32RL, RR pass {tan γR·v·ts} is obtained based on an average value γR of gradients γRL, γRR in the front and rear direction which are obtained for the respective inclination-state obtainment objects Rp located in front of the respective rear left and right wheels 32RL, RR {γR=(γRL+γRR)/2}. A road surface height xr can be obtained by obtaining a cumulative value of the average value xhr.

$$xr=\Sigma(\tan\gamma R\cdot v\cdot ts)$$

A difference xfr between these road surface heights xf, xr is a front/rear difference xfr, i.e., a difference in height between (i) portions of the road surface through which the respective front wheels 11FL, FR pass and (ii) portions of the road surface through which the respective rear wheels 32RL, RR pass.

$$xfr=\Sigma(\tan\gamma F\cdot v\cdot ts)-\Sigma(\tan\gamma R\cdot v\cdot ts)$$

Based on the front/rear difference xfr, a pitching moment Mp estimated to be generated due to the road input is obtained according to the following equation (K* is a constant):

$$Mp=K^*\cdot xfr$$

A road-input-dependent pitch-suppression target rotation angle θpref, and a rotational direction of each of the rotary electric actuators 50FL, FR, RL, RR for the respective vertical-force generating devices 43FL, FR, RL, RR provided for the respective front left and right and rear left and right wheels 11FL, FR, 32RL, RR are obtained so as to suppress the pitching moment Mp. In this case, the four rotary electric actuators 50FL, FR, RL, RR output a torque which can suppress a pitching moment generated due to the road input.

For each of the front left and right and rear left and right wheels 11, 32, a target rotation angle θref of the rotary electric actuator 50 is obtained by adding the road-surface-input-dependent roll-suppression target rotation angle θrref to the road-input-dependent pitch-suppression target rotation angle θpref.

$$\theta ref=\theta rref+\theta pref$$

After a time obtained by subtracting the preview compensation time τ from the previewable time Lp/v passes from the image-pickup of the inclination-state obtainment object Rp, the control command values representing the target rotation angle θref and the rotational direction of each of the rotary electric actuators 50 are output to a corresponding one of the electric motor ECUs 56FL, FR, RL, RR provided for the respective front left and right and rear left and right wheels 11, 32.

As described above, the roll moment Mr and the pitching moment Mp estimated to be generated due to the road input are obtained, and the control command values are output to the rotary electric actuators 50 in the preview control so as to suppress the roll moment Mr and the pitching moment Mp. As a result, when each of the front wheels 11 and the rear wheels 32 passes through a corresponding one of the inclination-state obtainment objects Rp, the roll moment and the pitching moment are suppressed better, improving ride comfort.

Also, the under-spring force reduction control explained in Embodiment 1 may be executed in addition to the road-input-dependent roll-moment suppression control and the road-input-dependent pitching-moment suppression control. Conversely, the road-input-dependent roll-moment suppression control and the road-input-dependent pitching-moment suppression control may be executed in Embodiment 1.

It is possible to consider a speed Δxfr of change in a height difference of the road surface in the front and rear direction when obtaining the pitching moment estimated to be generated due to the road input.

$$\Delta xfr = d/dt \cdot \{\Sigma(\tan \gamma F \cdot v \cdot ts) - \Sigma(\tan \gamma R \cdot v \cdot ts)\}$$

$$Mp = Ka^* \cdot xfr + Kb^* \cdot \Delta xfr \text{(each of } Ka^*, Kb^* \text{ is a constant)}$$

Providing the four road surface image obtainers 130 is not essential. The road surface image obtainers 130 do not necessarily need to be provided in front of the respective rear wheels 32RL, RR because the gradients obtained by the road surface image obtainers 130FL, FR can be used.

Embodiment 4

While light is emitted from the emitting device or devices of the road surface state obtaining device in the front and rear direction of the vehicle in the above-described embodiments, this system may be configured such that light is emitted in the right and left direction.

As illustrated in FIG. 22(a), a road surface state obtaining device 200 includes left and right road surface image obtainers 201L, 201R provided at a central portion of the front face of the vehicle body 8. The road surface image obtainer 201L includes: a left emitting device 202L configured to emit parallel light beams in the left direction; and a left imaging device 204L provided below the left emitting device 202L. When the parallel light beams are emitted from the left emitting device 202L, the parallel light beams impinge on the road surface to form two marks on the road surface respectively at positions spaced apart from each other in the right and left direction, and the left imaging device 204L takes an image of an image pickup object containing these two marks. The road surface image obtainer 201R includes: a right emitting device 202R configured to emit parallel light beams in the right direction; and a right imaging device 204R provided below the right emitting device 202R. When the parallel light beams are emitted from the right emitting device 202R, two marks are formed on the road surface respectively at positions spaced apart from each other in the right and left direction, and the right imaging device 204R takes an image of these two marks.

By comparing a lateral distance between two mark images ML1, ML2 obtained on a processed image JcL and a lateral distance between two mark images MR1, MR2 obtained on a processed image JcR with each other, it is possible to obtain a direction of the gradient of the road surface in the right and left direction.

(1) Case where Road Surface is Parallel with Reference Road Surface

As illustrated in FIG. 22(b), a left road surface image obtainer 201L obtains the processed image JcL containing the mark images ML1, ML2, and a right road surface image obtainer 201R obtains the processed image JcR containing the mark images MR1, MR2. A distance bL0 in the lateral direction (i.e., in the y direction) between the two mark images ML1, ML2 on the processed image JcL is equal to a distance bR0 in the lateral direction between the two mark images MR1, MR2 on the processed image JcR (bL0=bR0). Each of the distances bL0, bR0 is referred to as "reference distance".

(2) Case where Road Surface Inclines in Direction in which Height Increases from Left Side to Right Side As illustrated in FIG. 22(c), on the picked-up image JcL, a distance bL1 between the two mark images ML1, ML2 in the lateral direction is less than the reference distance bL0 (bL1<bL0), and on the picked-up image JcR, a distance bR1 between the two mark images MR1, MR2 in the lateral direction is greater than the reference distance bR0 (bR1>bR0). Accordingly, the distance bR1 is greater than the distance bL1 (bR1>bL1).

(3) Case where Road Surface Inclines in Direction in which Height Increases from Right Side to Left Side As illustrated in FIG. 22(d), on the picked-up image JcL, a distance bL2 between the two mark images ML1, ML2 in the lateral direction is greater than the reference distance bL0 (bL0<bL2), and on the picked-up image JcR, a distance bR2 between the two mark images MR1, MR2 in the lateral direction is less than the reference distance bR0 (bR0>bR2). Accordingly, the distance bR2 is less than the distance bL2 (bL2>bR2).

As described above, the direction of the inclination of the right and left direction is determined by comparing the lateral distance bL between the two mark images on the processed image JcL and the lateral distance bR between the two mark images on the processed image JcR with each other.

The magnitude of the gradient on each of the left and right inclination-state obtainment objects RpL, RpR can be determined based on a corresponding one of the distances bL, bR on the respective processed images JcL, JcR. This determination can employ an average value of a gradient αL determined based on the distance bL and a gradient αR determined based on the distance bR.

FIG. 23(a) is a flow chart illustrating a road-surface-gradient obtaining program which is executed each time when a set time period is elapsed.

At S61, the lateral distances bL, bR each between the two mark images on a corresponding one of the processed images JcL, JcR are obtained. At S62, the gradients αL, αR in the right and left direction are determined based on the respective distances bL, bR in the lateral direction and respective left-side and right-side gradient determination tables respectively illustrated in FIGS. 23(b) and 23(c). At S63, an average value αf of these gradients is obtained {αf=(αL+αR)/2}. At S64, a left-right difference xLR in height of the road surface is determined.

The left-side gradient determination table illustrated in FIG. 23(b) represents a relationship in which the inclination angle α in a direction in which the left side is higher than the right side increases with increase in the distance bL in the lateral direction. The right-side gradient determination table illustrated in FIG. 23(c) represents a relationship in which the inclination angle (−α) in a direction in which the right side is higher than the left side increases, with increase in the distance bR in the lateral direction.

In the present embodiment, a lateral distance obtainer is constituted by, e.g., portions of the suspension ECU 70 which store and execute the processing at S61. A right-and-left-direction gradient obtainer is constituted by, e.g., portions of the suspension ECU 70 which store and execute the processings at S62 and 63.

It is noted that each of the left emitting device 202L and the right emitting device 202R may be configured to emit light such that a mark formed on the road surface has a line shape extending in the right and left direction.

A prism may be used such that the left emitting device 202L and the right emitting device 202R use the same light source.

While the embodiments of the present invention have been described above, the technical features in the embodiments may be combined as needed. For example, the rotary electric actuators (114, 50RL, 50RR) may be provided for the front wheels and each of the rear left and right wheels.

The present invention may be embodied with various changes and modifications, which may occur to those skilled in the art.

EXPLANATION OF REFERENCE NUMERALS 6, 100: Road Surface State Obtaining Device, 8: Vehicle Body (Over-spring Member), 10, 130: Road Surface Image Obtainer, 11: Front Wheel, 12, 102, 132: Emitting Device, 20, 21, 22: Light Source, 14, 106, 134: Camera, 14s: CCD, 14d: Image Forming Device, 32: Rear Wheel, 34, 110: Suspension, 36: Under-spring Member, 43: Vertical-force Generating Device, 44: L-shaped Bar, 50: Rotary Electric Actuator, 52: Inverter, 56: Motor ECU, 70: Suspension ECU, 112, 122: Stabilizer Bar, 114, 124: Rotary Electric Actuator, 200: Road Surface State Obtaining Device, 202: Emitting Device, 204: Camera

The invention claimed is:

1. A road surface state obtaining device, comprising:
an emitting device mounted on a vehicle body of a vehicle and configured to emit light such that a plurality of parallel light beams emitted from the emitting device impinge on a road surface to form a plurality of marks spaced apart from each other;
an imaging device mounted on the vehicle body and configured to form an image by taking an image of an image pickup object on a predetermined region containing the plurality of marks formed on the road surface; and
an inclination state obtainer configured to obtain an inclination state of the road surface based on a relative positional relationship between at least two mark images of a plurality of mark images on the image formed by the imaging device, the plurality of mark images respectively corresponding to the plurality of marks,
the inclination state obtainer comprising (a) a longitudinal distance obtainer configured to obtain a distance between the at least two mark images in the longitudinal direction as the relative positional relationship and (b) a gradient obtainer configured to obtain a magnitude of a gradient as the inclination state of the road surface based on the distance between the at least two mark images in the longitudinal direction which distance is obtained by the longitudinal distance obtainer, and
the gradient obtainer comprising a gradient-determination-table storage device configured to store a relationship between the magnitude of the gradient of the road surface and the distance between the at least two mark images in the longitudinal direction which distance is obtained by the longitudinal distance obtainer.

2. The road surface state obtaining device according to claim 1,
wherein the emitting device and the imaging device are mounted on the vehicle body in a relative positional relationship in which an emission angle of the light emitted from the emitting device with respect to a reference road surface of which normal line is a line extending in an up and down direction of the vehicle is greater than an inclination angle of an axis of the imaging device with respect to the reference road surface, and
wherein the gradient obtainer comprises a first gradient obtainer configured to obtain a greater gradient of the road surface when the distance between the at least two mark images in the longitudinal direction which distance is obtained by the longitudinal distance obtainer is long than when the distance between the at least two mark images in the longitudinal direction which distance is obtained by the longitudinal distance obtainer is short.

3. The road surface state obtaining device according to claim 2, wherein the inclination state obtainer comprises an inclination direction obtainer configured to obtain a positive value as an inclination angle of the road surface when the distance between the at least two mark images in the longitudinal direction which distance is obtained by the longitudinal distance obtainer is greater than a set value and configured to obtain a negative value as the inclination angle of the road surface when the distance between the at least two mark images in the longitudinal direction is less than the set value.

4. The road surface state obtaining device according to claim 1,
wherein the emitting device and the imaging device are mounted on the vehicle body in a relative positional relationship in which an emission angle of the light emitted from the emitting device with respect to a reference road surface of which normal line is a line extending in an up and down direction of the vehicle is less than an inclination angle of an axis of the imaging device with respect to the reference road surface, and
wherein the gradient obtainer comprises a second gradient obtainer configured to obtain a less gradient of the road surface when the distance between the at least two mark images in the longitudinal direction which distance is obtained by the longitudinal distance obtainer is long than when the distance between the at least two mark images in the longitudinal direction is short.

5. The road surface state obtaining device according to claim 4, wherein the emitting device and the imaging device are mounted on the vehicle body in a relative positional relationship in which an emission angle of the light emitted from the emitting device with respect to a reference road surface of which normal line is a line extending in an up and down direction of the vehicle is different from an inclination angle of an axis of the imaging device with respect to the reference road surface.

6. The road surface state obtaining device according to claim 1,
wherein the emitting device is mounted on the vehicle body in an attitude in which the light is emitted toward the road surface in a front and rear direction of the vehicle,
wherein the imaging device is mounted on the vehicle body in an attitude in which an axis of the imaging device extends in the front and rear direction of the vehicle, and
wherein the inclination state obtainer is configured to obtain an inclination state of the road surface in at least one of the front and rear direction and a right and left direction of the vehicle based on the distance between the at least two mark images in the longitudinal direction.

7. The road surface state obtaining device according to claim 1,
wherein at least one of the plurality of marks has a polygonal shape, and
wherein the inclination state obtainer comprises an obtainer configured to obtain a magnitude of a gradient as the inclination state of the road surface based on a relative positional relationship between at least two points on at least mark image having the polygonal shape on the image formed by the imaging device, and the at least two points comprise at least one vertex of the polygonal shape.

8. The road surface state obtaining device according to claim 1, wherein two of the plurality of points are provided respectively on one end portion and another end portion of the one mark in a predetermined direction.

9. A suspension system, comprising:
a road surface state obtaining device, the road surface state obtaining device comprising:
an emitting device mounted on a vehicle body of a vehicle and configured to emit light such that a plurality of parallel light beams emitted from the emitting device impinge on a road surface to form a plurality of marks spaced apart from each other;
an imaging device mounted on the vehicle body and configured to form an image by taking an image of an image pickup object on a predetermined region containing the plurality of marks formed on the road surface; and
an inclination state obtainer configure to obtain an inclination state of the road surface based on a relative positional relationship between at least two mark images of a plurality of mark images on the image formed by the imagining device, the plurality of mark images respectively corresponding to the plurality of mark,
the inclination state obtainer comprising (a) a longitude distance obtainer configured to obtain a distance between the at least two mark images in the longitudinal direction as the relative positional relationship and (b) a gradient obtainer configured to obtain a magnitude of a gradient as the inclination state of the road surface based on the distance between the at least two mark images in the longitudinal direction which distance is obtained by the longitudinal distance obtainer, and
the gradient obtainer comprising a gradient-determination-table storage device configured to store a relationship between the magnitude of the gradient of the road surface and the distance between the at least two mark images in the longitudinal direction which distance is obtained by the longitudinal distance obtainer; and
a suspension control device configured to control at least one suspension for at least one control target wheel based on the inclination state of the road surface which is obtained by the road surface state obtaining device, the road surface state obtaining device comprising a front-side road-surface-state obtainer configured to obtain an inclination state of a portion of the road surface which is located in front of the at least one control target wheel.

10. The suspension system according to claim 9,
wherein a plurality of suspensions as the at least one suspension are provided respectively corresponding to front left and right and rear left and right wheels of the vehicle, and each of the plurality of suspensions comprises an actuator capable of controlling a vertical force acting on an under-spring member and an over-spring member, and
wherein the suspension control device comprises a preview controller configured to, when the at least one control target wheel passes through an inclination-state obtainment object that is a portion of the road surface on which an inclination state is obtained by the road surface state obtaining device, control the actuator at a timing when the suspension is actuated in accordance with an inclination state of the inclination-state obtainment object.

11. The suspension system according to claim 9, wherein the suspension control device comprises a vertical-vibration suppressing controller configured to, when the at least one control target wheel passes through an inclination-state obtainment object that is a portion of the road surface on which an inclination state is obtained by the road surface state obtaining device, control the at least one suspension at a timing when a vibration of the vehicle body in an up and down direction due to a change in height position of the road surface is suppressed.

12. The suspension system according to claim 9,
wherein the at least one control target wheel is a left wheel and a right wheel,
wherein the road surface state obtaining device comprises a road-surface left-and-right-difference obtainer configured to obtain a difference in height between a left road surface portion that is a portion of the road surface which is located in front of the left wheel and a right road surface portion that is a portion of the road surface which is located in front of the right wheel, and
wherein the suspension control device comprises a roll suppressing controller configured to, when the left wheel passes through the left road surface portion, and the right wheel passes through the right road surface portion, control one of the at least one suspension which corresponds to the left wheel and another of the at least one suspension which corresponds to the right wheel at a timing when a roll moment estimated to act due to the difference in height of the road surface which is obtained by the road-surface left-and-right-difference obtainer is suppressed.

13. A road surface state obtaining device, comprising:
an emitting device mounted on a vehicle body of a vehicle and configured to emit light such that a plurality of parallel light beams emitted from the emitting device impinge on a road surface to form a plurality of marks spaced apart from each other;
an imaging device mounted on the vehicle body and configured to form an image by taking an image of an image pickup object on a predetermined region containing the plurality of marks formed on the road surface; and
an inclination state obtainer configured to obtain an inclination state of the road surface based on a relative positional relationship between at least two mark images of a plurality of mark images on the image formed by the imaging device, the plurality of mark images respectively corresponding to the plurality of marks, the inclination state obtainer comprising (a) a longitudinal distance obtainer configured to obtain a distance between the at least two mark images in the longitudinal direction as the relative positional relationship and (b) a gradient obtainer configured to obtain a magnitude of a gradient as the inclination state of the road surface based on the distance between the at least two mark images in the longitudinal direction which distance is obtained by the longitudinal distance obtainer, the emitting device and the imaging device being mounted on the vehicle body in a relative positional relationship in which an emission angle of the light emitted from the emitting device with respect to a reference road surface of which normal line is a line extending in an up and down direction of the vehicle is greater than an inclination angle of an axis of the imaging device with respect to the reference road surface, and the gradient obtainer comprising a first gradient obtainer configured to obtain a greater gradient of the road surface when the distance between the at least two mark images in the longitudinal direction which distance is obtained by the longitudinal distance obtainer is long than when the distance between the at least two mark images in the longitudinal direction which distance is obtained by the longitudinal distance obtainer is short.

14. A road surface state obtaining device, comprising:

an emitting device mounted on a vehicle body of a vehicle and configured to emit light such that a plurality of parallel light beams emitted from the emitting device impinge on a road surface to form a plurality of marks spaced apart from each other;

an imaging device mounted on the vehicle body and configured to form an image by taking an image of an image pickup object on a predetermined region containing the plurality of marks formed on the road surface; and an inclination state obtainer configured to obtain an inclination state of the road surface based on a relative positional relationship between at least two mark images of a plurality of mark images on the image formed by the imaging device, the plurality of mark images respectively corresponding to the plurality of marks, the inclination state obtainer comprising (a) a longitudinal distance obtainer configured to obtain a distance between the at least two mark images in the longitudinal direction as the relative positional relationship and (b) a gradient obtainer configured to obtain a magnitude of a gradient as the inclination state of the road surface based on the distance between the at least two mark images in the longitudinal direction which distance is obtained by the longitudinal distance obtainer, the emitting device and the imaging device being mounted on the vehicle body in a relative positional relationship in which an emission angle of the light emitted from the emitting device with respect to a reference road surface of which normal line is a line extending in an up and down direction of the vehicle is less than an inclination angle of an axis of the imaging device with respect to the reference road surface, and the gradient obtainer comprising a second gradient obtainer configured to obtain a less gradient of the road surface when the distance between the at least two mark images in the longitudinal direction which distance is obtained by the longitudinal distance obtainer is long than when the distance between the at least two mark images in the longitudinal direction is short.

* * * * *